United States Patent [19]

Tracey et al.

[11] 4,234,957

[45] Nov. 18, 1980

[54] METHOD AND APPARATUS FOR GENERATING TIMING PHASE ERROR SIGNALS IN PSK DEMODULATORS

[75] Inventors: Robert J. Tracey, Downers Grove, Ill.; Stevan D. Bradley, Palo Alto; William F. Hartley, Belmont, both of Calif.

[73] Assignee: GTE Automatic Electric Laboratories Incorporated, Northlake, Ill.

[21] Appl. No.: 966,228

[22] Filed: Dec. 4, 1978

[51] Int. Cl.² ............... H03D 3/18; H04L 27/22; H04L 25/40
[52] U.S. Cl. ............... 375/86; 375/120
[58] Field of Search ............... 325/320; 178/67, 69.1; 328/72, 155, 133; 340/146.1 D, 147 SY; 329/110

[56] References Cited

U.S. PATENT DOCUMENTS

| | | | |
|---|---|---|---|
| 3,544,717 | 1/1970 | Smith | 178/69.1 |
| 3,633,108 | 1/1972 | Kneuer | 325/323 |
| 3,806,815 | 4/1974 | Fletcher | 325/320 |
| 4,011,407 | 3/1977 | DiSanti et al. | 325/320 |
| 4,079,329 | 3/1978 | England et al. | 325/320 |
| 4,091,331 | 5/1978 | Kaser et al. | 325/320 |

OTHER PUBLICATIONS

Carrier & Clock Recovery from Transversal Equalizer Tap Settings for Partial Response Systems by J. Steel and B. M. Smith, IEEE Transactions on Communications, Sep., 1975, pp. 976–979.

High Performance MOS/LSI Modems by Earl D. Gibson, Conference Record, 1972, IEEE International Conference on Communications, Session 29, pp. 29-18 to 29-23.

The Design of Nonlinear Phase-Tracking Loops by Simulation by G. Scholimeier and N. Schatz, IEEE Transactions on Communications, Feb., 1975, pp. 296–299.

Timing Recovery in Synch Digital Receivers, Muller and Muller, pp. 516–530, May 1978, IEEE Transactions on Communications.

Performance Monitoring of a Digital Radio by PE Detection Hogge, Collins, Rockwell International, Dallas Texas.

A Timing Phase Correction Technique for PSK Demodulators, Tracey & Bradley, GTE Lenkert, 1105 County Road, San Carlos, Calif.

*Primary Examiner*—Benedict V. Safourek
*Attorney, Agent, or Firm*—Russell A. Cannon

[57] ABSTRACT

A circuit arrangement for combining a measure of the single phase error for a received data signal in a PSK demodulator with a measure of the direction of rotation of the receive data signal phasor between adjacent sample times for producing a timing phase error signal for controlling the phase of a local clock timing signal in the demodulator. In a demodulator producing a digital word defining differences between the phases of decoded phasors at adjacent sample times, a binary bit $D_k$ of the digital word may define the direction of rotation of the received signal phasor between the adjacent sample times. Sample values of the signal phase error signal in the demodulator are quantized into single binary bits $E_k$ indicating the sense of the signal phase error at sample times. In one circuit arrangement, binary bits $E_k$ and $D_k$ are combined in an exclusive-OR gate for producing a binary timing phase error bit $M_k$. In a demodulator where phase differences are consecutively numbered clockwise in straight binary, the output of the exclusive-OR gate is inverted for producing binary timing phase error bits $M_k$. In another circuit arrangement, binary bits $A_k$ and $B_k$ indicating the sense of the in-phase and quadrature-phase signal components for decoded phasors at a number of sample times are logically combined with signal phase error bits $E_k$ for producing binary timing phase error bits $M_k$ at sample times.

52 Claims, 25 Drawing Figures

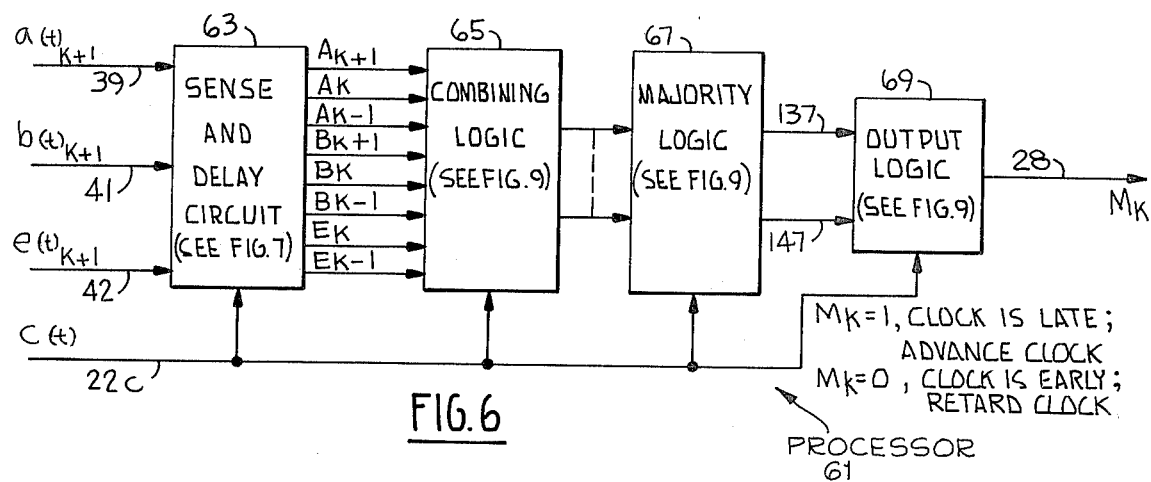
FIG. 6
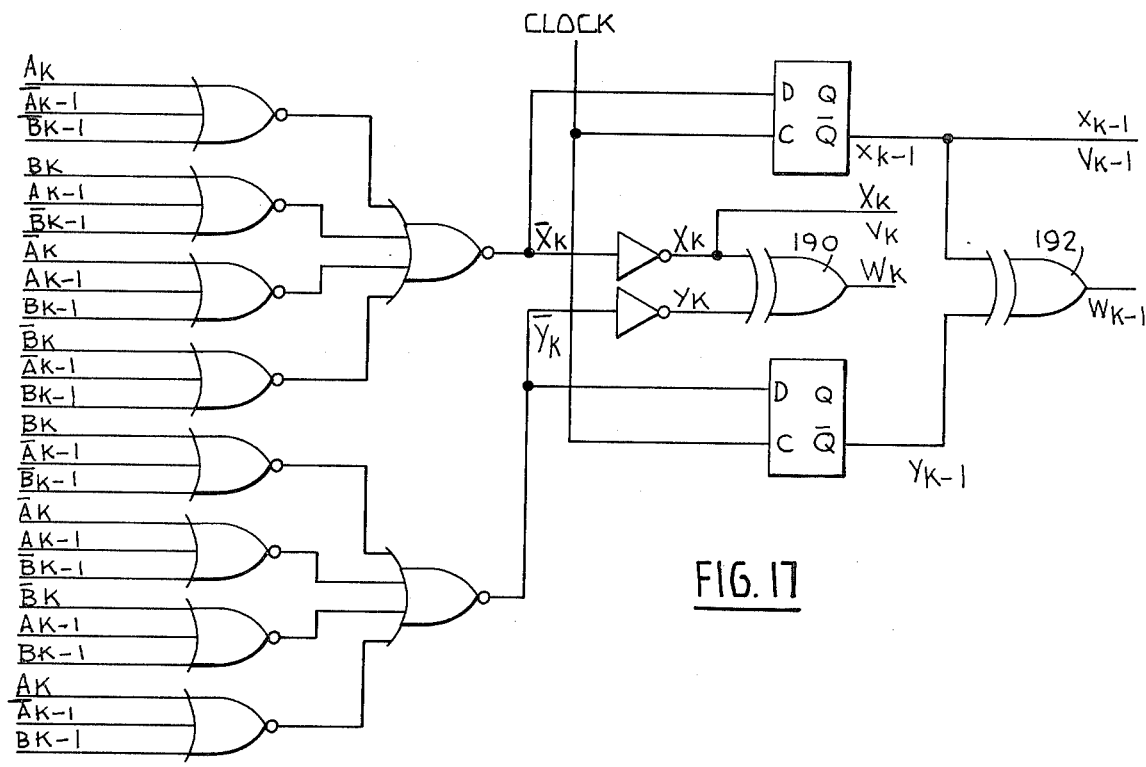
FIG. 17
FIG. 10
| 1 | | 2 | 3 | 4 | 5 | 6 |
|---|---|---|---|---|---|---|
| | TERM (i) to (iv) OF EQ (14) | LINE 137 | LINE 147 | LINE 167 | LINE 164 | LINE 165 |
| 1 | MAJORITY 1's | 0 | 1 | 1 | 0 | 1 |
| 2 | | 0 | 1 | 0 | 0 | 1 |
| 3 | MAJORITY 0's | 1 | 0 | 1 | 1 | 0 |
| 4 | | 1 | 0 | 0 | 1 | 0 |
| 5 | EQUAL NO. 1's & 0's | 1 | 1 | 1 | 1 | 0 |
| 6 | | 1 | 1 | 0 | 0 | 1 |

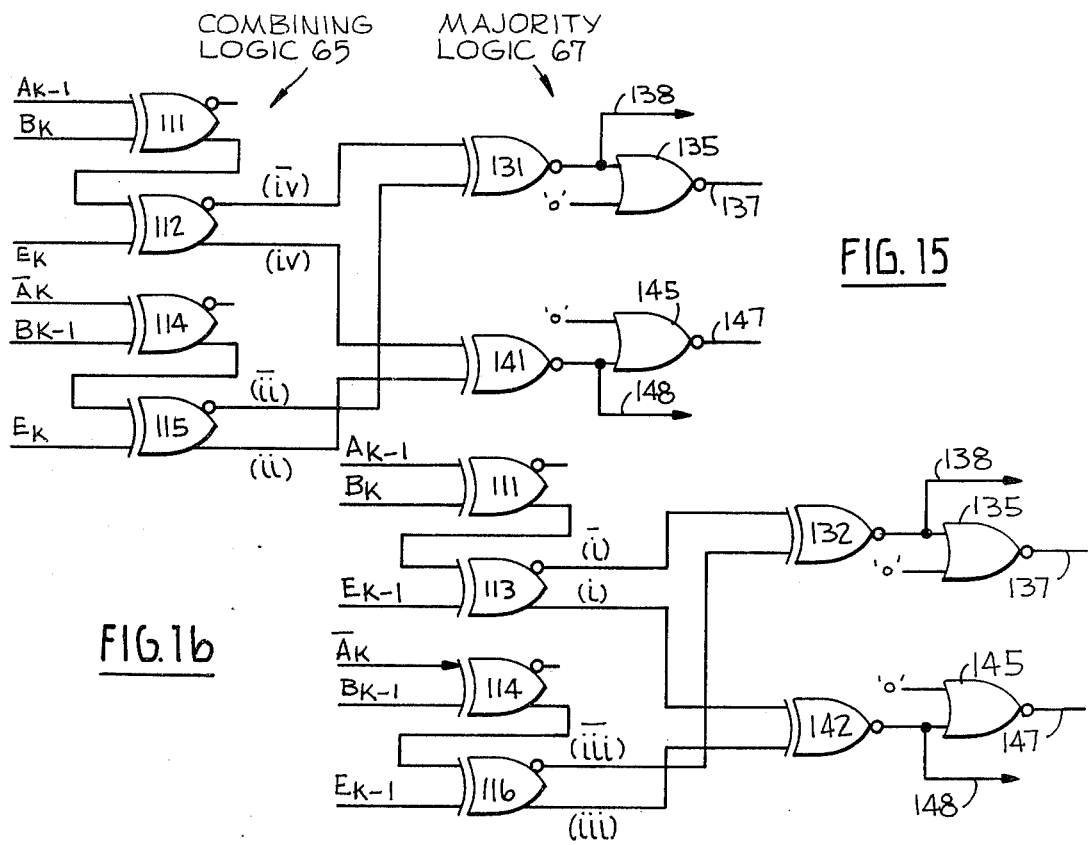
FIG. 15
FIG. 16
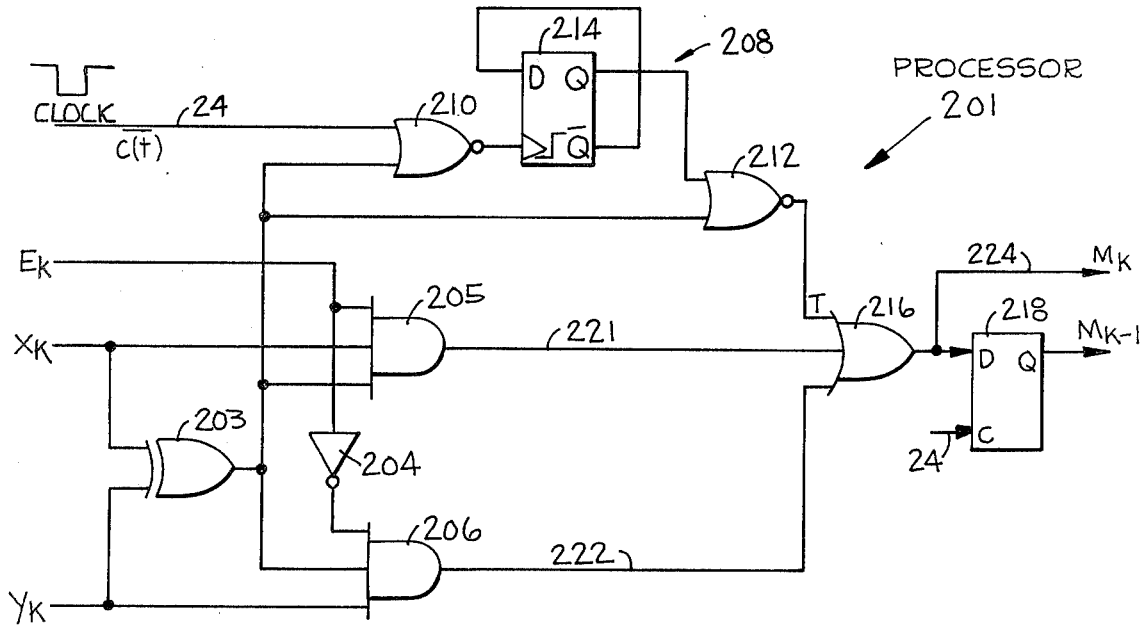
(21) $M_K = (X_K \cdot \overline{Y}_K \cdot E_K) + (\overline{X}_K \cdot Y_K \cdot \overline{E}_K) + (M_{TOGGLE})$
(22) $\overline{M}_K = (X_K \cdot \overline{Y}_K \cdot \overline{E}_K) + (\overline{X}_K \cdot Y_K \cdot E_K) + (M_{TOGGLE})$
(23) $(M_{TOGGLE}) = (\overline{X}_K \cdot \overline{Y}_K) + (X_K \cdot Y_K) = \overline{X_K \oplus Y_K}$
FIG. 18

| 1 | 2 | 3 | 4 | 5 | 6 | 7 | 8 | 9 |
|---|---|---|---|---|---|---|---|---|
| ΔΘk | ΔΘk | ΔΘk | Ek | ΔΘk | ΔΘk | Mk @ FIG.18 | Mk @ FIG.19 | Mk @ FIG.20 |
| GRAY CODED | CCW BINARY CODED | CW BINARY CODED | 1=CCW 0=CW | DEGREES | DIRECTION | | CCW BINARY CODED ΔΘk | CW BINARY CODED ΔΘk |
| Xk Yk | Vk Wk | Vk Wk | | | | Xk Yk | Vk⊕Ek | $\overline{V_k \oplus E_k}$ |
| 1 1 / 1 1 | 1 0 / 1 0 | 1 0 / 1 0 | 1 / 0 | +180° | — | TOGGLE | 1 0 / 0 1 | 1 0 / 0 1 |
| 1 0 / 1 0 | 0 1 / 0 1 | 1 1 / 1 1 | 1 / 0 | +90° | CCW / CCW | 1 0 / 0 1 | 1 0 / 0 1 | 1 0 / 0 1 |
| 0 0 / 0 0 | 0 0 / 0 0 | 0 0 / 0 0 | 1 / 0 | 0° | — | TOGGLE | 0 1 / 1 0 | 0 1 / 1 0 |
| 0 1 / 0 1 | 1 1 / 1 1 | 0 1 / 0 1 | 1 / 0 | +270° (−90°) | CW / CW | 0 1 / 1 0 | 0 1 / 1 0 | 0 1 / 1 0 |

FIG. 21

(DECISION TABLE FOR FIG. 18, 19, 20)

(CCW TRIBITS) FIG. 22

METHOD AND APPARATUS FOR GENERATING TIMING PHASE ERROR SIGNALS IN PSK DEMODULATORS

BACKGROUND OF INVENTION

This invention relates to synchronization of clock timing signals in digital data communication systems operating with data signals defined by multidimensional signal sets, and more particularly to improved method and apparatus of generating timing phase error signals in demodulators of synchronous phase shift keyed (PSK) data receivers for adjusting the phase of a local clock timing signal there.

The receiver of a synchronous PSK data system generally equalizes the received signal prior to sampling during each symbol interval for recovering transmitted data. It is essential that timing in the receiver and the received signal be synchronized in order to insure optimum sampling of the received signal in each symbol interval, i.e., at a time when the phase of the signal is fully established and not in a state of transition. A number of conventional techniques are available for generating a local clock timing signal of the correct frequency in the receiver. By way of example, the amplitude of the received data signal may be detected and filtered to produce a local clock timing signal which has the same frequency as the timing signal used to generate the data signal. It is more difficult to make the phase of the local clock timing signal to the same as that of timing in the received data signal because of temperature and aging variations in timing circuits and the data path.

Timing phase error signals for adjusting the phase of the local clock timing signal have previously been generated and used in feedback loops. In the article "Timing Recovery in Digital Synchronous Data Receivers" by K. H. Mueller and M. Muller, IEEE Transactions on Communications, May 1976, pp. 516–531, samples of received data signals are processed to produce an indication of a timing function that is a measure of the pulse response of the data transmission system. This indication is used as the timing error signal for adjusting the clock phase in a direction for making the value of the timing function zero. The article states that the technique there is applicable to binary pulse-amplitude modulation (PAM) and partial-response signals, both of which are defined by unidimensional signal sets. In that method, only a single signal is available for processing to produce a timing phase error signal. The article does not teach how to extend the technique there for data signals that are defined by multidimensional signal sets. It also states that the discussion there is limited to baseband signaling, and concentrates on timing recovery alone and independent of carrier phase control, a synchronous carrier signal being assumed from external circuitry. The U.S. Pat. No. 3,544,717, Dec. 1, 1970, Timing Recovery Circuit by Larrabee M. Smith describes a timing phase correction technique in which the phase of a locally generated square wave timing signal is compared with transition pulses derived from received baseband mark and space type data pulses for driving a number of binary counters to produce control signals for advancing or retarding the phase of the local clock timing signal. The U.S. Pat. No. 3,633,108, Jan. 4, 1972, Timing Recovery Through Distortion Monitoring in Data Transmission Systems by Joseph G. Kneuer, describes a clock pulse correction technique with compensates for mistiming in the receiver eye pattern by generating caliper levels straddling a nominal received amplitude. The caliper spacing is continually expanded or contracted, depending on whether the received signals at sample times lie outside of or between the caliper levels. The phase of the sampling wave is made to sweep back and forth about its nominal position, the direction of the sweep being reversed whenever the caliper spacing requires expanding.

SUMMARY OF INVENTION

An object of this invention is the provision of improved method and apparatus of producing a timing phase error signal in PSK synchronous data communication systems.

In accordance with this invention, apparatus for producing a clocktiming phase error signal in receiver circuitry of a synchronous PSK data transmission system comprises: first means responsive to a received data signal and a local clock timing signal produced in the receiver circuitry for producing a first error signal which is a measure of the signal phase error signal e(t), the latter being a measure of the angular difference between the phase $\theta(t)_k$ of a receiver phasor in the receiver data signal and the nearest allowable member $\theta_k$ of an ideal set of signal phasors; second means responsive to the received data signal and the local clock timing signal for producing a first directional signal which is a measure of the direction of rotation of a received signal phasor between adjacent clock sample times; and third means for combining the first error signal and the first directional signal so as to produce a timing phase error signal which is a measure of the difference between the phase of the local timing signal and that of timing in the received data signal. This timing phase error signal may be used in the receiver circuitry for adjusting the phase of the local clock signal there to be more nearly equal to the phase of timing in the received data signal. In one embodiment, the first means produces a first error signal that is a binary bit $E_k$ indicating the sense of the signal phase error at a sample time and the second means produces binary bits $A_k$ and $B_k$ indicating the sense of in-phase and quadrature-phase components of allowable phasors at a number of sample times, the third means combining binary indications $A_k$, $B_k$, and $E_k$ at a number of sample times for producing a binary bit $M_k$ indicating the sense of the timing phase error. In a preferred embodiment, the first means produces a binary bit $E_k$ indicating the sense of the signal phase error at a sample time and the second means produces a binary bit $D_k$ indicating the sense of the direction of rotation of the received signal phasor between adjacent sample times, the third means producing a binary bit $M_k$ indicating the sense of the timing phase error. In a modified form of the preferred embodiment in which the bit $D_k$ is a binary bit of a digital word indicating the difference between the phases of allowable phasors at adjacent sample time, the third means comprises an exclusive-OR gate. In another embodiment, in a system where the phase differences are consecutively numbered clockwise in straight binary, the third means further comprises means for inverting the output of the exclusive-OR gate. An improved method embodying this invention is a synchronous PSK data system including receiver circuitry providing a local clock timing signal and responsive to a receive data signal for producing a sample $e(t)_k$ of the phase error signal and a directional signal indicating the difference between the phase of allowable phasors in adjacent symbol intervals, comprises the step of combining the signal phase error signal sample $e(t)_k$ and the directional signal for producing a timing phase error signal.

DESCRIPTION OF DRAWINGS

This invention will be more fully understood from the following detailed description of preferred embodiments thereof, together with the drawings which are briefly described here. In these drawings and descriptions, signals such as $a(t)$ designated by lower case letters are time varying analog signals having both a sense and an amplitude, whereas $a(t)_k$ represents the value of $a(t)$ at a sample time. Signals such as $A_K$ which are designated by capital letters have binary values representing the sense or sign of $a(t)$ at a sample time.

FIG. 6 on sheet 4 is a block diagram of one embodiment of the signal processor 25 embodying this invention in FIG. 1.

FIG. 10 on sheet 4 is a table illustrating the operation of the processor 61 in FIG. 9 upon consideration of logic levels on lines 121 to 128 in FIG. 9 and resultant logic levels on designated other lines there.

FIG. 15 on a sheet 9 is a logic diagram of alternate embodiments of the combining and majority logic 65 and 67 in FIG. 6 for an alternate embodiment of this invention.

FIG. 16 on sheet 9 is a logic diagram of alternate embodiments of the combining and majority logic 65 and 67 for another embodiment of this invention.

FIG. 17 on sheet 4 is a logic diagram of a circuit responsive to output signals in FIG. 7 for producing associated digital words $X_kY_k$ in Gray-code and $V_kW_k$ in straight binary indicating differences $\Delta\theta_K$ between decisions as to the phases of received phasors which are numbered in Gray-code.

FIG. 18 on sheet 9 is a circuit diagram of an alternate embodiment of this invention that is responsive to Gray-code words $X_kY_k$ defining phase differences $\Delta\theta_K$ in FIG. 17 and to the binary signal phase error bit $E_k$ for producing a binary timing phase error bit $M_k$.

FIG. 21 on sheet 10 is a tabulation illustrating the operation of the embodiments of this invention in FIGS. 18, 19, and 20.

GLOSSARY t: time
T: period of symbol interval $\theta_n$: a transmitted phasor; the phase of a transmitted phasor; the phase of a transmitted carrier signal at a particular instant of time n: an integer $a_n$: $\cos \theta_n$ $b_n$: $\sin \theta_n$ $x(t)_k$, $y(t)_k$: in-phase and quadrature-phase component signals defining a phasor having a phase $\theta_n$ in a transmitted data signal k: a subscript which is an integer designating a sample value f(t-nT): a function defining the shape of a transmitted data pulse s(t): a received data signal which may be equalized c(t): a local clock timing signal in receiver circuitry in FIG. 1 a(t), b(t): time varying in-phase and quadrature-phase components of a received phasor in a demodulated signal $a(t)_k$, $b(t)_k$: analog values of a(t) and b(t) at a sample time $\theta(t)_k$: a received phasor; the phase of the received phasor derived from a receive data signal s(t) at a sample time $\theta_k$: the nearest allowable phase of a phasor of an ideal set of signal phasors for a received phasor having a phase $\theta(t)_k$ at a sample time, where $\theta_n = \theta_k$ for an ideal system; the decoded phase of a phase $\theta(t)_k$ $a_k$, $b_k$: $\cos \theta_k$ and $\sin \theta_k$; in-phase and quadrature-phase components of an allowable phasor $\theta_k$ $A_k$, $B_k$: binary valued variables indicating the sign or sense of $a_k$ and $b_k$ $\Delta\theta_\kappa$: the difference between the phases of allowable phasors in adjacent symbol intervals e(t): the analog signal phase error signal which is equal to $\sin(\theta(t)_k - \theta_k)$ $e(t)_k$: an analog signal indicating the signed magnitude of the signal phase error at a sample time $E_k$: a binary valued variable indicating the sense of $e(t)_k$ $m_k$: an analog timing phase error signal obtained at a sample time $M_k$: a binary valued variable indicating the sign or sense of $m_k$ g(t-nT): a measure of system pulse response for a particular individual pulse occurring in one symbol interval h(t-nT): a measure of interference of one of the in-phase and quadrature-phase component signals a(t) and b(t) in the other component signal $g_{\pm 1}$: values of the first pulse tail and precursor of the impulse response g(t)

Figure 2:
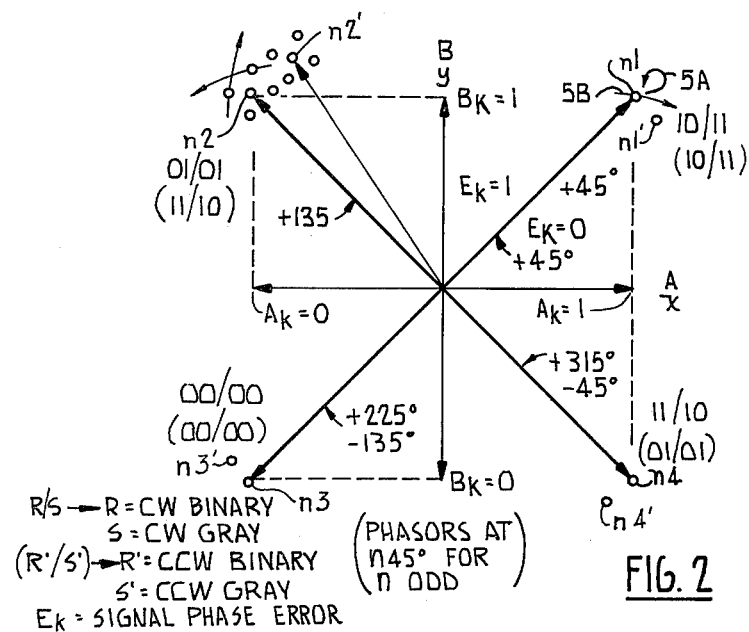
FIG. 2 on sheet 2 is a plot of phasors in a 4-phase PSK data system; the pairs of dibits without and with parentheses designating phases of phasors that are numbered clockwise and counterclockwise, respectively; the dibits above and below each slash line being binary and Gray-code designations of associated phases; and the symbol $E_k$ designating the sign or sense of the signal phase error sigal sample $e(t)_k$ on line 42 in FIG. 1.
Figure 12:
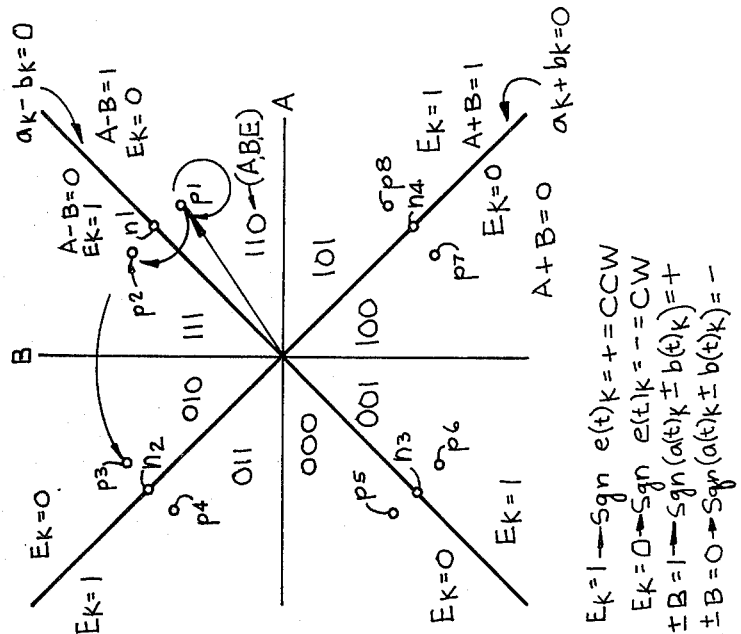
FIG. 12 on sheet 7 is a plot of the end points of phasors (not phase differences) which graphically illustrates the operation defined by the tabulation in FIG. 11.
Figures 13, 14:
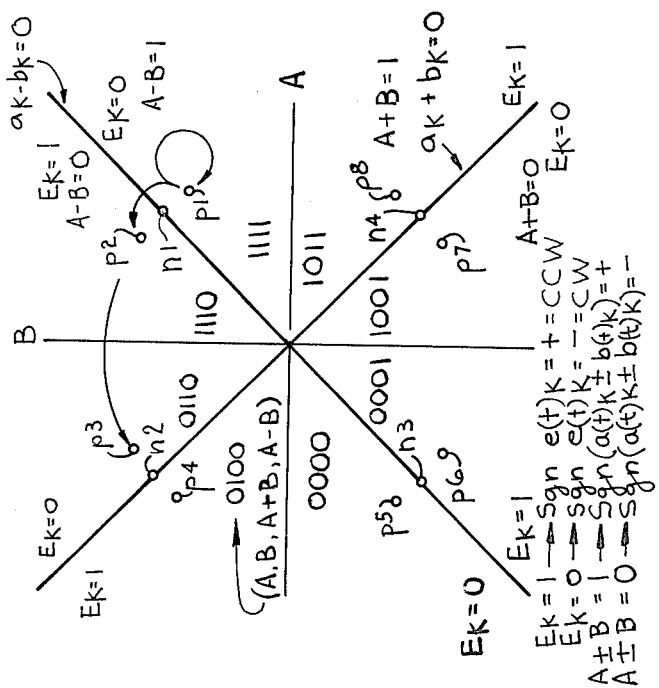
FIG. 13 on sheet 8 is an alternate tabulation illustrating the operation of a processor similar to the one in FIG. 9 but based on consideration of the logic levels of the binary signal variables A, B, A+B, and A−B in adjacent symbol intervals.
FIG. 14 on sheet 8 is a plot of the end points of phasors (as opposed to phase differences) which graphically illustrates the operation defined by the tabulation in FIG. 13.

$G_{-1}$, $G_{+1}$: binary indications of the sense or sign of $g_{-1}$ and $g_{+1}$ V,W: binary valued variables defining a phase difference $\Delta\theta_\kappa$ in straight binary X,Y: binary valued variables defining a phase difference $\Delta\theta_\kappa$ in Gray-code $J(\Delta\theta)$, $I(\Delta\theta)$: quantizing functions for $\sin \Delta\theta_\kappa$ $\epsilon$: designates the expected value P: designates probability MAJ: designates the majority n1-n4: nodes upon which phasors extending from the origin in FIG. 2 terminate p1-p7: nodes upon which phasors extending from the origin in FIGS. 12 and 14 would terminate

DESCRIPTION OF PREFERRED EMBODIMENTS

As indicated in the article, "Differential Encoding of Multiple Amplitude and Phase-Shift Keying Systems" by William J. Weber III, IEEE Transactions on Communications, vol. COM-26, No. 3, March 1978, pp. 385-391, communications systems are available with modulation techniques providing a variety of two-dimensional and other multi-dimensional structures as well as unidimensional signal sets. Binary, multilevel pulse-amplitude-modulated and partial response type signals are described by unidimensional signal sets. Systems with quadrature amplitude (QAM) phase shift-keyed, absolute phase shift-keyed and differentially encoded phase shift-keyed modulation schemes, for example, produce passband signals described by two-dimensional signal constellations. Although this invention is applicable to the various types of data communication systems with signals describing two-dimensional signal constellations, it is described hereinafter primarily in relation to a synchronous 4-phase PSK data communication system with absolute encoding and providing a two-dimensional circular signal set for simplicity of illustration.

Figure 4A:
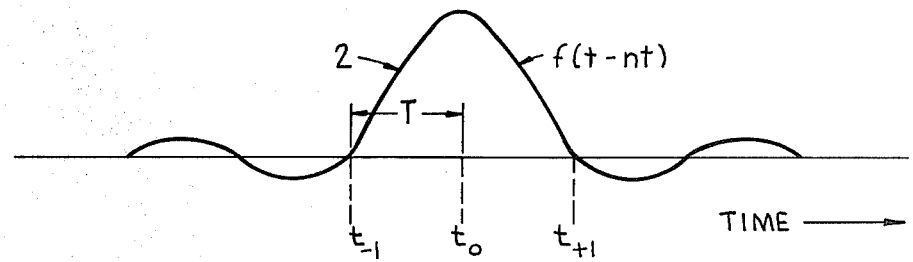
FIGS. 4A and 4B on sheet 3 are waveforms illustrating pulses with raised-cosine frequency domain characteristics.

A data system generally comprises a pair of data modems that are connected together over a transmission channel. In passband PSK data systems, the phase of a carrier frequency signal produced in a modem transmitter is shifted a specified number of degrees with respect to a reference phase during each symbol interval, at a rate set by the clock signal there (see FIG. 2). In a perfect modem transmitter, a carrier signal vector or phasor is produced that is defined by in-phase and quadrature-phase components $$x(t) = \sum_n a_n f(t - nT)$$

and $$y(t) = \sum_n b_n f(t - nT),$$

where $a_n = \cos \theta_n$; $b_n = \sin \theta_n$; $\theta_n$ is the transmitted carrier phase; f(t nt) defines the shape of transmitted pulses; t is time; T is the sample interval; and n is an integer. The transmitted carrier phase $\theta_n$ is one of four different values in a 4-phase PSK system, for example, the phasor passing through one of the four nodes n1-n4 that are defined by component values $x(t)_k$ and $y(t)_k$ at each sample time (see FIG. 2). Between sample times the carrier phase is changing to move the phasor to the same or a different node as indicated by arrows 5A and 5B in FIG. 2 and in FIGS. 12 and 14. In an ideal system with zero intersymbol interference this phase-modulated carrier signal is band-limited by the data system so that the over-all system response has a raised cosine spectrum, for example, as is illustrated in FIG. 4A. The waveform 2 here illustrates the shape of components of individual transmitted data pulses in an ideal system. The shape of wave 2 is defined by the function f(t−nT). The tails and precursors of the impulse response there are 0-valued at sample times other than $t_0$, i.e., f(t−nT)=0 for all t=nT, except for n=0 where f(t−nT)=1.

Figure 4B:
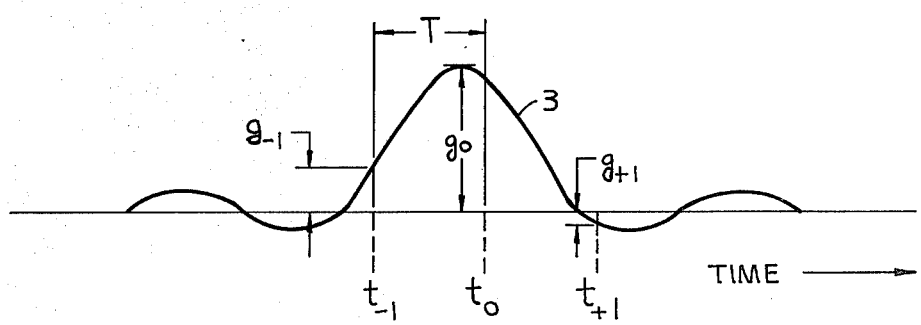

In practice, the phases of the carrier and timing signals in the transmitter and receiver of associated modems are not perfectly synchronized and the transmitted data signal is distorted in transmission over the data channel such that the tails and precursors of components of individual data pulses are no longer 0-valued at sample times as is illustrated in FIG. 4B. This causes intersymbol interference which reduces the noise immunity of the system and may cause decoding errors even in the absence of external noise. The received data signal may be equalized in the modem receiver to compensate for distortion introduced by the transmission channel. In the modem receiver circuitry in FIG. 1, the equalized signal s(t) is demodulated to produce the in-phase and quadrature-phase signal components a(t) and b(t) that are sampled at the symbol rate 1/T for decoding data in s(t). The phase of the local carrier there locks up to any one of the received carrier phases and stays locked to it. The waveform 3 in FIG. 4B illustrates the shape of components of individual data pulses in a received data signal which is perfectly equalized. Assuming that s(t) is a perfectly equalized signal means that the waves 2 and 3 are of the same shape and that tails and precursors in both of the waves 2 and 3 are 0-valued at sample intervals nT, for n≠0. The wave 3 in FIG. 4B is shifted in phase with respect to the sample times, however, to show that there is a phase error between timing in the circuit of FIG. 1 and in s(t) which causes precursors and tails of the wave 3 to be non-0-valued at sample times.

Figure 1:
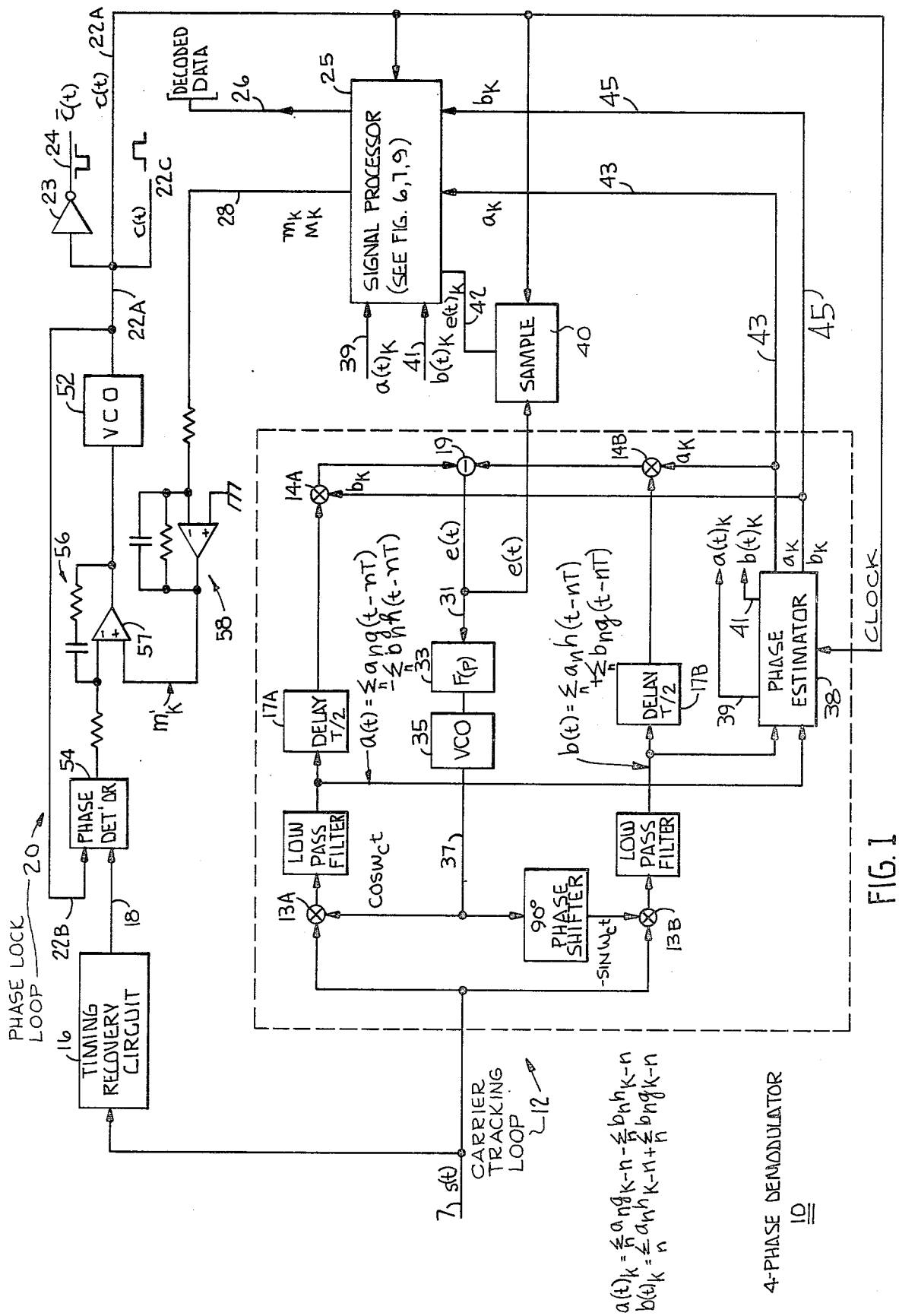
FIG. 1 on sheet 1 is a block diagram of receiver circuitry in a data modem of a 4-phase PSK data transmission system embodying this invention.

The demodulator 10 in FIG. 1 generally comprises a decisiondirected carrier tracking loop 12, a timing recovery circuit 16 which detects and filters the equalized signal s(t) for recovering a timing signal therefrom, a phase lock loop 20 for narrow-band filtering the recovered timing signal on line 18, a signal processor 25 for outputting decoded data on line 26 and an indication $M_k$ of the clock-timing phase error on line 28. The subscript k in this description indicates a sample value of the associated variable in some symbol interval unless specified otherwise. The timing recovery circuit 16, loops 12 and 20, and the operation of processor 25 for producing the decoded data are conventional. The processor 25 operates in a novel manner, hower, for producing indications $M_k$ or $m_k$ of timing phase error, as is described more fully hereinafter.

The carrier loop 12 within the dash lines in FIG. 1 operates in the manner described in U.S. Pat. No. 3,806,819, Apr. 23, 1974, Decision Feedback Loop for Tracking a Poly-Phase-Modulated Signal by James C. Fletcher and in Telecommunications System Engineering by William C. Linsey and Marvin K. Simon, Prentice-Hall, Inc., copyright 1973, for providing: an indication e(t) on line 31 of the signal phase error for the equalized signal s(t) for synchronizing the local carrier signal on line 37 from VCO 35 with the transmitted carrier signal in s(t); signal indications $a(t)_k$ and $b(t)_k$ on lines 39 and 41 defining received phasors; and signal indications $a_k$ and $b_k$ on lines 43 and 45 defining the nearest allowable phasor $\theta_k$ of an ideal signal set associated with a received phasor.

A sample-hold circuit 40 is responsive to a local clock signal and the signal e(t) for producing a sample value $e(t)_k$ thereof on line 42.

The derived timing signal on line 18 has the same frequency 1/T as timing in the associated transmitter which generated the equalized signal s(t). The timing loop 20 includes a VCO 52 that produces a corrected or local clock-timing signal c(t) on line 22B which is compared with the recovered timing signal on line 18 in a phase detector 54 for producing an error signal which is filtered in an active lowpass loop filter 56 prior to its driving the VCO 52. Although the clock signal c(t) on lines 22 and timing in the equalized signal s(t) are of the same frequency, the phases thereof may be sufficiently different to cause intersymbol interference and nonoptimum sampling of data in the demodulated signal as is indicated in FIGS. 4A and 4B.

Assuming that the signal s(t) on line 7 is perfectly equalized, any resultant intersymbol interference in decoding a(t) and b(t) may be caused by a signal phase error which results from either timing phase error or carrier phase error. The timing phase error is the difference between the phase of the local clock signal c(t) on lines 22 in FIG. 1 and the phase of timing in s(t). Signal phase error is the angular difference between the phase $\theta(t)_k$ of an individual sampled-received signal phase having components $a(t)_k$, $b(t)_k$ and the phase $\theta_k$ of the nearest allowable member of the ideal PSK signal set, the phase reference for the signal phase error being established by the current phase of the recovered carrier signal on line 37. One source of signal phase error is carrier phase error which appears in the demodulated signal as a rotation of the received signal set with respect to the ideal signal set.

Carrier phase error occurs when there is a difference between the phase reference of s(t) and the local recovered carrier. The signal e(t) in FIG. 1 is a measure of the signal phase error in the demodulated signal, and more specifically of sin $(\theta(t)_k - \theta_k)$, where $\theta_k$ here is the decoded phase of an associated received signal phase $\theta(t)_k$, i.e., $\theta_k$ is the receivers estimate of $\theta(t)_k$. This signal phase error e(t) is graphically illustrated in FIG. 5 for a 4-phase PSK system. The mean value of e(t) is proportional to the carrier phase error, while individual samples $e(t)_k$ of e(t) are proportional to the signal phase error at the sample time.

If the phase $\theta_n$ of the transmitted phasor is +135° in FIG. 2, for example, and there is neither carrier not timing phase error in the perfectly equalized signal s(t), then the phases $\theta(t)_k$ of detected received phasors having components $a(t)_k$, $b(t)_k$ in demodulator 10 are precisely +135°. If these components $a(t)_k$ and $b(t)_k$ are applied to an oscilloscope, then a single dot appears at an angle of +135°, i.e., node n2. If the only error in the perfectly equalized signal s(t) is a carrier phase error of −5°, however, then the detected signals cause the dot n2 (as well as the other dots n1, n4 and n3) to move clockwise 5° to the position of the dot n2'. If the only error in s(t) is a timing phase error (i.e., there is no carrier phase error at this instant), then the sampled signals appear as a cluster of dots centered around n2, for example, each of the dots there corresponding to the position of the end point of a received phasor at the sample time. If there are both carrier and timing phase errors in s(t) then the dots will be centered about node n2', i.e., the cluster of dots is rotated from the nominal center point at node n2. It is desirable to continuously adjust the phases of the local clock and local carrier signals for synchronizing them with corresponding information in a perfectly equalized signal s(t). The loop 12 automatically adjusts the phase of the local carrier signal for synchronizing it with one of the carrier phases in s(t) and centering phasors about ones of the nodes n1–n4. It has been discovered that the signal phase error e(t) contains information as to which side of an ideal node a received phasor is located. In accordance with one embodiment of this invention the processor 25 is responsive to a sample value $e(t)_k$ of the signal phase error signal $e(t)$ in carrier loop 12 and to sample values $a(t)_k$ and $b(t)_k$ of the in-phase and quadrature-phase components defining received phasors in particular symbol intervals for producing a binary timing phase error signal $M_k$. This binary signal $M_k$ is averaged by an active lowpass filter 58 and applied to the amplifier 57 for biasing the clock VCO 52 to adjust the phase of the local clock signal $c(t)$ on line 22 for synchronizing it with timing in $s(t)$.

In order to provide a more complete understanding of the operation and scope of this invention, analytical descriptions of various embodiments of the processor 25 that produce timing phase error signals have been developed. Since it is believed that such a familiarity with the basic operation of this invention will facilitate comprehending it, analytical descriptions of a processor 25 producing analog and binary timing phase error signals $m_k$ and $M_k$ are developed here prior to presenting detailed descriptions of various preferred embodiments of this invention. This analytical description appears in greater detail in the paper "A Timing Phase Correction Technique for PSK Demodulators" presented by R. J. Tracey and S. D. Bradley at the National Telecommunication Conference (NTC '78), Birmingham, Alabama, December 3-6, 1978 in Session 06, and which is incorporated herein by reference.

Briefly, the equalized signal $s(t)$ is demodulated by combining it with in-phase and quadrature-phase local carrier signals $\cos \omega_c t$ and $-\sin \omega_c t$ in product modulators 13A and 13B. The demodulation products are filtered to remove the carrier and higher harmonics. The filtered signal contains the in-phase and quadrature-phase component signals $a(t)$ and $b(t)$ which are representable as $$a(t) = \sum_n a_n g(t - nT) - \sum_n b_n h(t - nT) \quad (1)$$

and $$b(t) = \sum_n a_n h(t - nT) + \sum_n b_n g(t - nT) \quad (2)$$

The function $g(t-nT)$ is a measure of the system pulse response for a particular individual pulse occurring in one symbol interval. The function $h(t-nT)$ represents interference of one of the component signals $a(t)$ and $b(t)$ in the other component signal. The local clock signal $c(t)$ on lines 22 causes the phase estimator 38 to sample the time varying signals $a(t)$ and $b(t)$ for producing sample values $a(t)_k$ and $b(t)_k$ which are representable as $$a(t)_k = \sum_n a_n g_{k-n} - \sum_n b_n h_{k-n} \quad (3)$$
$$b(t)_k = \sum_n a_n h_{k-n} + \sum_n b_n g_{k-n} \quad (4)$$

which are determined to be or are quantized into estimates $a_k = \cos \theta_k$ and $b_k = \sin \theta_k$ of the closest phasor of the allowable-ideal signal set. The signals $a(t)$ and $b(t)$ are delayed one symbol interval and combined with associated estimates $b_k$ and $a_k$ in multipliers 14A and 14B to produce cross product signals which are combined in a difference circuit 19 to produce the indication $e(t)$ of the signal phase error. Ignoring the delay introduced by the phase estimator and circuits 17A and 17B, $e(t)$ is representable as $$e(t) = a_k b(t) - b_k a(t) = \sin(\theta(t)_k - \theta_k), \quad (5A)$$

and $$e(t)_k = a_k b(t)_k - b_k a(t)_k \quad (5B)$$

Figure 5:
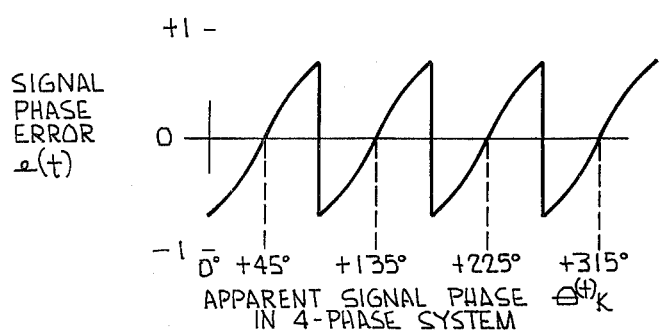
FIG. 5 on sheet 2 is a plot of the signal phase error signal $e(t)$ on line 31 in FIG. 1 as a function of the phase $\theta(t)_k$ of received phasors.

The signal $e(t)$ is plotted as a function of the apparent signal phase $\theta(t)_k$ in FIG. 5 which shows that $e(t)$ is 0-valued when the phase $\theta(t)_k$ of the received phasor is precisely the phase $\theta_k = \theta_n$ of an allowable phasor and the transmitted phasor. The signal phase error $e(t)$ is averaged in the lowpass filter 33 and applied to VCO 35 for synchronizing its phase with that of the carrier in $s(t)$. At a particular sample instant when there is no intersymbol interference, i.e., no timing error, then the value of the signal phase error is representable as $e(t)_k = 0$ since $a_k = a(t)_k = a_n$ and $b_k = b(t)_k = b_n$ at that time.

In order to phase lock the local clock signal $c(t)$ on line 22B with timing in the equalized signal $s(t)$ to compensate for timing errors in the modem receiver, it is necessary to determine whether the modem receiver is sampling the equalized pulse train in $s(t)$ early or late and then either retard or advance the phase of the local clock accordingly. This may be accomplished with a timing phase error signal that is a measure of a timing function $F(t)$ that is an indication of the impulse response of the transmission system (see FIG. 4B). In an ideal system, $F(t_n) = 1$ for $n=0$ and $F(t_n) = 0$ for $n \neq 0$. This means that measures $g_{\pm 1}(t_o \pm T) = g_{\pm 1}$ of the first pulse tail and precursor of the impulse response $g(t)$ are both 0. If the local clock causes late sampling, then $g_{-1} > 0$, $g_{+1} < 0$, and $g_{-1} - g_{+1} > 0$. It has been determined that the expected value of the product of the signal phase error $e(t)$ at a sample time $t_0$ and the sine of the difference (between the estimated received phase angle $\theta_k$ at sample time $t_0$ and the estimated phase angles $\theta_{k \pm 1}$ at associated adjacent sample times $t_0 \pm T$) are proportional to the inverse of $g_{\pm 1}$. This is expressed mathematically as $$-g_{+1} = 2\epsilon\{\sin(\theta_k - \theta_{k-1})e(t)_k\}, \quad (6)$$

$$-g_{-1} = 2\epsilon\{\sin(\theta_k - \theta_{k+1})e(t)_k\}, \quad (7)$$

and $$g_{-1} - g_{+1} = 2\epsilon(e(t)_k\{\sin(\theta_{k+1} - \theta_k) + \sin(\theta_k - \theta_{k-1})\}) \quad (8)$$

the latter being the difference between the expressions in equations (6) and (7) and $\epsilon$ denoting the expected value. Timing phase error signals satisfying the requirements of equations (6)-(8) may be used to adjust the phase of the local clock signal $c(t)$.

It has been determined that the sense $E_k$ alone (as well as the signed magnitude) of the signal $e(t)_k$ in equations (6), (7), and (8) gives an indication of whether a particular received phasor at a phase $\theta(t)_k$ is clockwise or counterclockwise of a given allowable phasor at a phase $\theta_k$ in FIGS. 2, 12, and 14, for example, at the sample time. Since the phasor in a PSK system may be moving either clockwise or counterclockwise between sample times, however, it is also necessary to note the direction in which the received phasor is moving between sample times. It is assumed that a received phasor moves in a direction between adjacent sample times that makes associated angular phase changes $\leq 180°$. It has also been discovered that the sense alone (as well as the signed magnitude) of the sine of the difference $\Delta\theta_k$ between the phases of allowable phasors associated with received phasors in adjacent symbol intervals contains an indication of the direction of rotation of the received phasor between sample times, which indication may be called a directional signal. A binary bit $D_k$ of certain digital words defining the phase differences $\Delta\theta_K$ also indicates the direction received phasors move between sample times, even for the indeterminate states where a phasor moves 0° to 180°.

The expressions in equations (6) and (7) are rewritten as $$-g_{+1} = 2\epsilon\{[a_{k-1}b_k e(t)_k] + [\bar{a}_k b_{k-1} e(t)_k]\} \quad (9)$$

and $$-g_{-1} = 2\epsilon\{[a_{k+1}b_k e(t)_k] + [\bar{a}_k b_{k+1} e(t)_k]\} \quad (10)$$

where $a_k = -a_k$, by expanding the trigonometric identities there for the difference between two quantities and substituting sample values $a_k = \cos\theta_k$ and $b_k = \sin\theta_k$ in various symbol intervals for the resultant trigonometric functions. All of the terms in equations (9) and (10) may have both a sense and a variable magnitude. Binary functions $$-G_{+1}(k) = \epsilon(MAJ\{(A_{k-1}\oplus b_k\oplus E_k); (\bar{A}_k\oplus B_{k-1}\oplus B_{k-1}\oplus E_k)\}) \quad (11)$$

and $$-G_{-1}(k) = \epsilon(MAJ\{(A_{k+1}\oplus B_k\oplus E_k); (\bar{A}_k\oplus B_{k+1}\oplus E_k)\}) \quad (12)$$

of the sense of $-G_{\pm 1}$ are obtained by replacing all of the time-varying terms in equations (9) and (10) with binary valued variables corresponding to the sense thereof and represented by capital letters, where $\bar{A}$ is the inverse of the logic level in the variable A and MAJ designates the binary value of the majority of the terms there. The binary values of $G_{\pm 1}$ are determinate when a majority of the terms are of the same sense and are indeterminate values of an equal number of terms correspond to a binary 1 and 0.

Reference to equations (11) and (12) reveals that samples of the detected received signal components are required in three adjacent symbol intervals $k-1$, $k$, and $k+1$. By delaying the signal defined by equation (12) one symbol interval to obtain a signal $-G_{-1}(k-1)$ which is representable as $-G_{-1}(k-1) = \epsilon(MAJ\{-(A_k\oplus B_{k-1}\oplus E_{k-1}); (\bar{A}_{k-1}\oplus B_k\oplus E_{k-1})\})$, (13)

all of the variables in equations (11) and (13) are obtainable during the two adjacent symbol intervals $k-1$ and $k$. The difference between the expressions in equations (11) and (13) is representable as $$G_{-1}(k-1) - G_{+1}(k) = \epsilon[MAJ\{(A_{k-1}\oplus B_k\oplus E_{k-1}); \quad (14)$$
$(\bar{A}_k \oplus B_{k-1} \oplus E_K); (\bar{A}_k \oplus B_{k-1} \oplus E_{k-1}); (A_{k-1} \oplus B_k \oplus E_k)\}]$.

Thus, the equations (9)–(14) are derived from and are expansions of one or more of the equations (6)–(8). The binary values of variables defined by equations (13) and (14) are also indeterminate when an equal number of terms are a binary 1 and 0. The value of the binary variables defined by equations (9)–(14) may be toggled for an indeterminate state (i.e., the binary value of the variable is alternated from what it was during a prior indeterminate state). Timing phase error signals satisfying equations (9)–(14) may also be used to adjust the phase of the local clock signal c(t). The first, second, third and fourth terms in equation (14) are referred to hereinafter by the symbols i, ii, iii, and iv, respectively.

Binary timing phase error signals defined by quantized variables $E_k$, $I_k$, and $I_{k+1}$ that represent the sense of the signal magnitude terms $e(t)_k$, $\sin(\theta_k - \theta_{k-1})$, and $\sin(\theta_k - \theta_{k+1})$ in equations (6) and (7) are also obtainable. The quantized value of the variable $E_k$ is a logic 1 and 0, for example, when $e(t)_k$ is + and −, respectively. In one quantizing scheme which has 3 levels for the sin $\Delta\theta_K$ terms there, a quantizing function $I(\Delta\theta)$ is defined as $$I(\Delta\theta) = 0 \text{ at } \Delta\theta_K = 9°, 180° \quad (15A)$$

$$I(\Delta\theta) = +1 \text{ at } \Delta\theta_K = +45°, +90°, +135° \quad (15B)$$

$$I(\Delta\theta) = 1 \text{ at } \Delta\theta_K = -45°, -90°, -135° \quad (15C)$$

for an 8-phase PSK system. Substituting the function $I(\Delta\theta)$ for $\sin(\Delta\theta_K)$ and $E_k$ for sgn $e(t)_k$ (where sgn means sign or sense) in equation (6), for example, reveals that the expected value of the product of $E_k$ and $I(\Delta\theta)$ is expressed in accordance with Bayes Law as $$\epsilon[I(\Delta\theta) E_k] = P\{I(\Delta\theta) = 0\} \epsilon[I(\Delta\theta)E_k/I(\Delta\theta) = 0] \quad (16)$$
$$+ P\{I(\Delta\theta) = +1\} \epsilon[I(\Delta\theta)E_k/I(\Delta\theta) = +1]$$
$$+ P\{I(\Delta\theta) = -1\} \epsilon[I(\Delta\theta)E_k/I(\Delta\theta) = -1]$$

where P designates the probability of the associated function. The first term in equation (16) is 0 valued since the expected value there is 0 for $I(\Delta\theta) = 0$. Consideration of equations (3), (4) and (5) also reveals that $e(t)_k$ is representable as $$e(t)_k = h_0 + h_1\cos\Delta\theta_k - g_{+1}\sin\Delta\theta_k + \sum_{\substack{n \neq k \\ n \neq k-1}} f_{k-n}, \quad (17)$$

where $$f_{k-n} = \cos(\Lambda_k - \theta_n)h_{k-n} - \sin(\theta_\kappa - \theta_n)g_{k-n}. \quad (18)$$

The expected value of $e(t)_k$ in equation (17) over the positive values of $\Delta\theta_K$ is $h_0 - (1+\sqrt{2})g_1$, since $f_{k-n}$ is symmetrical about this value for $n \neq k$ and $n \neq k-1$. Similarly, the expected value of $e(t)_k$ over the negative values of $\Delta\theta_K$ is $-h_0 - (1+\sqrt{2})g_1$. Consideration of these expressions reveals that two conditional densities $[I(\Delta\theta)E_k|\Delta\theta_K = +1]$ and $[I(\Delta\theta_K = -1]$ are symmetrically distributed about these mean values. The sign of $\epsilon[I(\Delta\theta)E_k]$ for $I(\Delta\theta) = \pm 1$ in equation (16) is therefore the same as the sign of the sum of these values, i.e., $(h_0 - (1+\sqrt{2})g_1) + (-h_0 - (1+\sqrt{b})g_1) = -2(1+\sqrt{2})g_1$. This shows that equation (16) does define a timing phase error signal since the resultant is proportional to $-g_1$.

In another quantizing scheme for the sine $\Delta\theta_K$ terms in equations (6) and (7) and having only two levels, a quantizing function $J(\Delta\theta)$ is $$J(\Delta\theta) = +1 \text{ at } \Delta\theta_K = 0°, +90°, +135° \quad (19A)$$

$$J(\Delta\theta) = -1 \text{ at } \Delta\theta_K = 180°, -45°, -90°, -135° \quad (19B)$$

for an 8-phase system. Substituting $J(\Delta\theta)$, and $E_k$ in equation (6) reveals a timing phase error signal for which the expected value of the product $E_k$ and $J(\Delta\theta)$ is defined as $$\epsilon[J(\Delta\theta)E_k] = P\{J(\Delta\theta) = +1\} \epsilon[J(\Delta\theta)E_k/J(\Delta\theta) = +1] \quad (20)$$
$$+ P\{J(\Delta\theta) = -1\} \epsilon[J(\Delta\theta)E_k/J(\Delta\theta) = -1].$$

Consideration of equation (20) reveals that expected values of the signal phase error $e(t)_k$ for positive and negative values of $J(\Delta\theta)$ are $h_0 + h_1 - (1+\sqrt{2})g_1$ and $-h_0 + h_1 - (1+\sqrt{2})g_1$. Thus, the sense of the expression in equation (20) is the sign of the term $h_1-(1+\sqrt{2})g_1$ rather than the sense of $g_1$ alone as it was for the other quantizing function $I(\Delta\theta)$. Although the term $h_1$ tends to degrade the performance of a processor satisfying the requirements of equation (20), h1 is small in a well-equalized modem receiver and is 0-valued for a perfectly equalized signal s(t).

Referring now to FIG. 6, a signal processor circuit 61 embodying this invention for producing a binary timing phase error bit $M_k$ that satisfies the expression in braces in equation (14) comprises sense and delay circuit 63, combining logic circuit 65, majority logic circuit 67, and output logic circuit 69. The processor circuit 61 is described here in relation to a 4-phase PSK data system for simplicity of illustration. The sense and delay circuit 63 is responsive to signal samples $a(t)_{k+1}$, $b(t)_{k+1}$, and $e(t)_{k+1}$ in a particular symbol interval for producing binary indications A, B, and E of the sense thereof in different symbol intervals. Alternatively, the circuit 63 may be responsive to signals $a_k$, $b_k$ and $e(t)_k$ for producing the binary indications A, B, and E. The combining logic circuit 65 combines various ones of the outputs of circuit 63 to produce prescribed logic signals corresponding to associated terms (i) to (iv) in equation (14) and FIG. 9 and the inverse of these prescribed logic signals. The majority logic circuit 67 processes the outputs of circuit 65 for producing logic signals on lines 137 and 147, indicating whether the majority of the prescribed logic signals corresponding to terms in equation (14) are a logic 1 or 0. The output logic 69 decodes the logic signals on lines 137 and 147 for producing a binary timing phase error bit $M_k$ of 1 and 0 when a majority of the prescribed logic signals from circuit 65 are logic 1 and 0, respectively; and for toggling $M_k$ (i.e., alternating the logic level of $M_k$ from what it was during the prior similar condition) when an equal number of prescribed logic signals from circuit 65 are 1 and 0. The timing phase error bit $M_k$ is averaged by lowpass filter 58 in FIG. 1 for producing a measure $m_k'$ of the expected value thereof. The signal $m_k'$ which corresponds to the signal $G_{-1-+1}$ in equation (14) is applied to the timing loop 20 for adjusting the phase of the local clock VCO 52.

Figure 7:
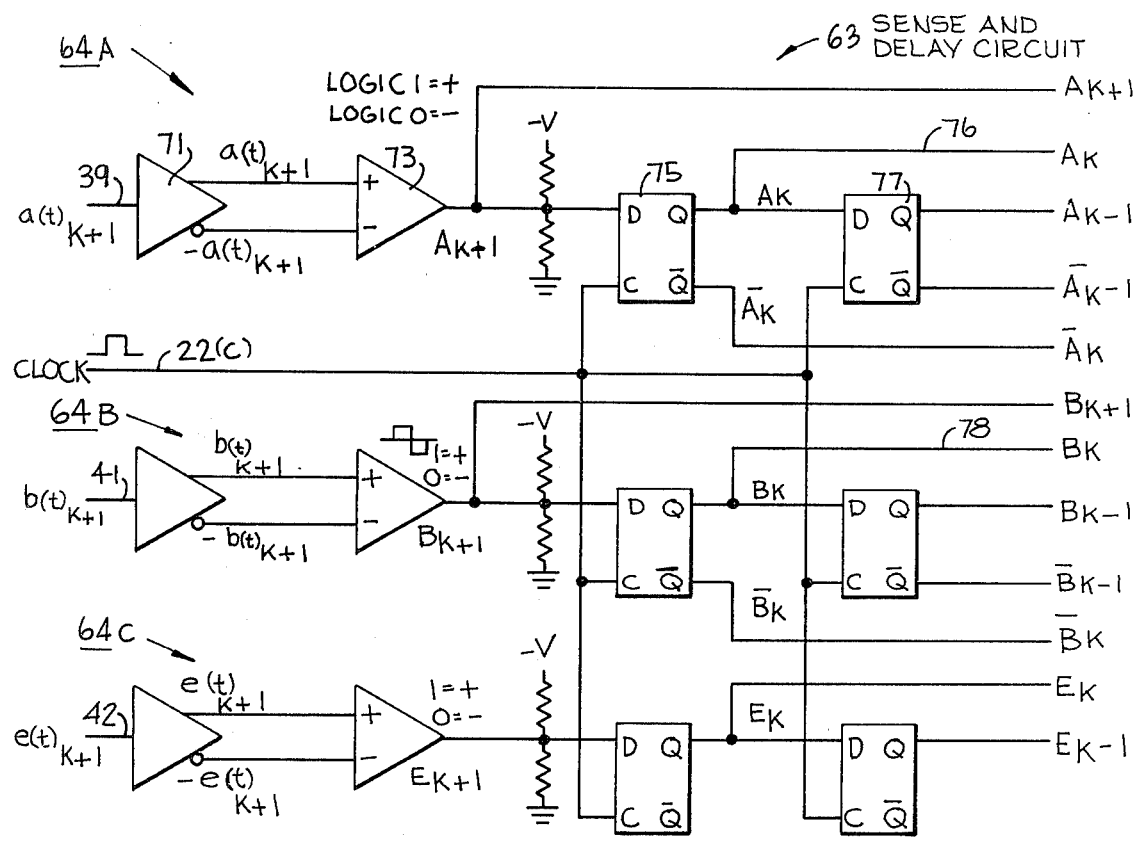
FIG. 7 on sheet 5 is a schematic circuit and logic diagram of the sense and delay circuit 63 of FIG. 6 for producing binary valued variables defined by capital letters that represent the sense of associated analog signals $a(t)_{k+1}$, $b(t)_{k+1}$, and $e(t)_{k+1}$ on lines 39, 41 and 42 at various sample times and the inverse thereof.

Referring now to FIG. 7, the sense and delay circuit 63 comprises similar sections 64A, 64B, and 64C that are responsive to associated signal samples $a(t)_{k+1}$, $b(t)_{k+1}$, and $e(t)_{k+1}$. The circuit section 64A, for example, comprises an operational amplifier 71, a high-gain differential operational amplifier 73, and a pair of D-type flip-flops (FF) 75 and 77, which are connected in series. The amplifier 71 produces analog output signals $a(t)_{k+1}$ and $-a(t)_{k+1}$ of the same magnitude and opposite sense. The differential amplifier 73 combines these signals for producing an output voltage signal $A_{k+1}$ of one and other magnitudes (corresponding to a logic 1 and 0) when $a(t)_{k+1}$ is positive and negative, respectively. Thus, the logic symbol $A_{k+1}$ indicates the sense of the analog signal $a(t)_{k+1}$ in the $K-1^{th}$ symbol interval. The binary signal $A_{k+1}$ is delayed by flip-flops 75 and 77 (which are driven by the local clock signal on line 22C) for producing binary signals $A_k$, $\overline{A}_k$, $A_{k-1}$, and $\overline{A}_{k-1}$ in different symbol intervals. The circuit section 64C operates in a similar manner for producing binary indications $E_k$ and $E_{k-1}$ of the sense of a signal sample $e(t)_k$.

Figure 8:
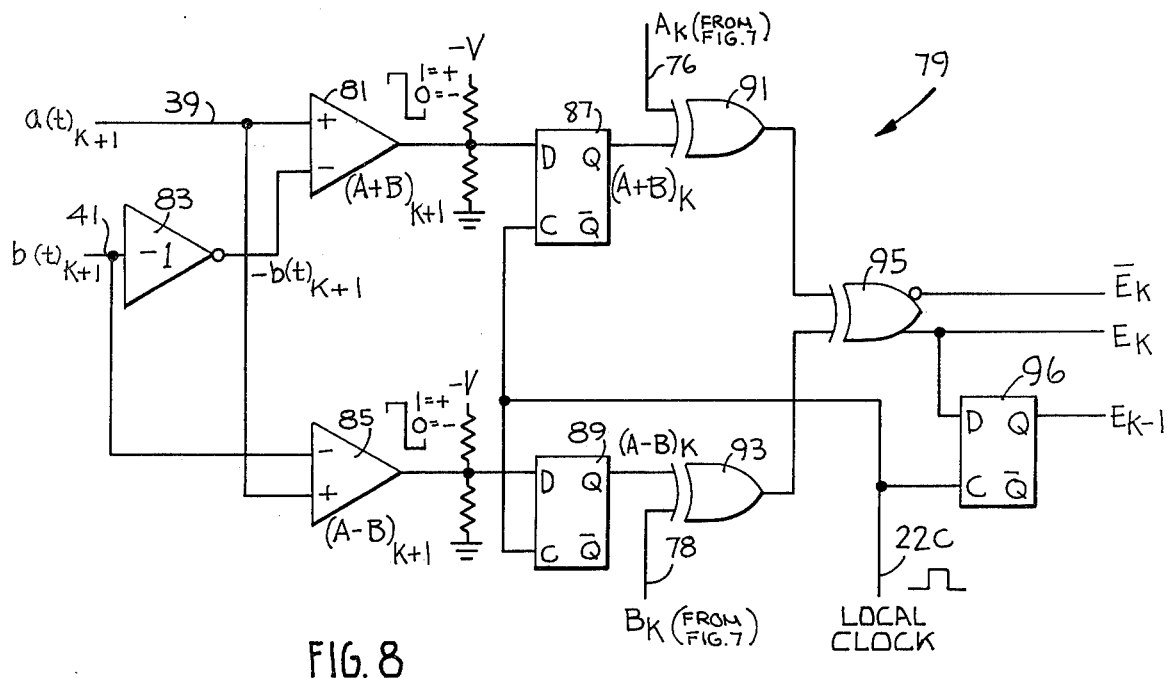
FIG. 8 on sheet 5 is a diagram of a logic circuit 79 for producing variables $E_k$ representing the sense of the signal phase error signal $e(t)$ in various symbol intervals and the inverse $\overline{E}_k$ thereof from analog samples $a(t)_{k+1}$ and $b(t)_{k+1}$ of the demodulated data signal in a 4-phase system. The circuit 79 is not incorporated in the demodulator in FIG. 1.

A circuit 79 for producing indications $E_k$ and $E_{k-1}$ of the sense of the signal phase error in particular symbol intervals from signal samples $a(t)_{k+1}$ and $b(t)_{k+1}$ is illustrated in FIG. 8. The differential amplifier 81 there is responsive to analog signals $a(t)_{k+1}$ on line 39 and $-b(t)_{k+1}$ from inverter 83 for producing an output signal $(A+B)_{k+1}$ corresponding to logic 1 and 0 when the sum of the analog signal samples $a(t)_{k+1}$ and $b(t)_{k+1}$ is positive and negative, respectively. Conversely, the other differential amplifier 85 produces an output signal $(A-B)_{k+1}$ corresponding to a logic 1 and 0 when the difference between the signal voltages $a(t)_{k+1}$ and $b(t)_{k+1}$ is positive and negative, respectively. The outputs of these amplifiers 81 and 85 are delayed one symbol interval in flip-flops 87 and 89 prior to being combined with the logic signals $A_k$ and $B_k$ in exclusive-OR gates 91 and 93, respectively. The outputs of gates 91 and 93 are combined in a third Exclusive-OR gate 95 to produce logic signals $E_k$ and $\overline{E}_k$, which indicate the sense of the analog signal $e(t)_{k+1}$ in the $k^{th}$ symbol interval. The logic signal $E_k$ is delayed one symbol interval in flip-flop 96 for producing an associated logic signal $E_{k-1}$. In practice, the bit $E_k$ for a 4-phase PSK system may be obtained directly from a phase estimator that is normally used in an 8-phase system and which produces tribit words specifying octants containing received signal phasors. The LSB's of such tribit words correspond to bits $E_k$ and designate whether the phase $\theta(t)_k$ of a received signal phasor is clockwise or counterclockwise of the associated decoder phasor $\theta_k$. This result is illustrated graphically in FIG. 12 and described more fully hereinafter.

Figure 9:
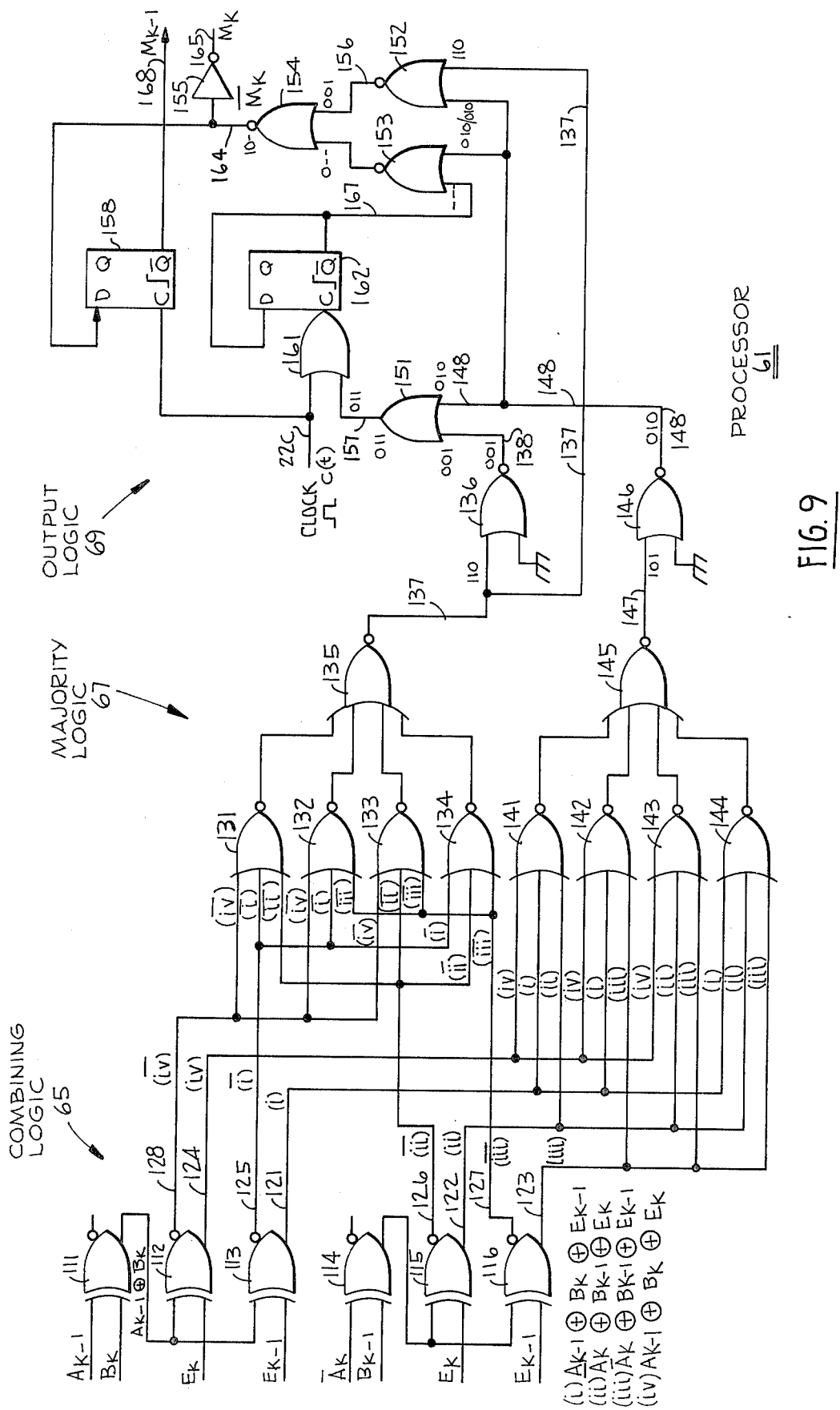
FIG. 9 on sheet 6 is a logic diagram of the combining, majority and output logic circuits 65, 67 and 69 of FIG. 6 for one embodiment of this invention.

The circuits 65, 67 and 69 of processor circuit 61 in FIG. 6 are shown in more detail in FIG. 9. The combining circuit 65 comprises a plurality of Exclusive-OR gates 111-116 for combining various ones of the outputs of circuit 63 into prescribed logic signals satisfying the Boolean expressions (i)-(iv) in equation (14) and FIG. 9, and to the inverse thereof. The majority logic 67 comprises pluralities of NOR-gates 131-135 and 141-145 that are responsive to selected logic signals from gates 111-116 for causing the outputs of gates 135 and 145 to be coded for indicating when the majority of the prescribed logic signals are 1 or 0. The direction that a phasor is moving between adjacent sample times is determinable when the majority of the prescribed signals are either a logic 1 or 0. This direction is indeterminate, however, when an equal number of prescribed signals are logic 1 and 0. The output logic circuit 69 comprises gates 146 and 152-155 and a D-type flip-flop 158 which operate on the outputs of gates 135 and 145 for producing a timing phase error bit $M_k$ of a logic 1 and 0 on line 165, which is employed to either advance or retard the phase of the local clock signal. The output logic circuit 69 also comprises gates 136, 151 and 161 and D flip-flop 162 which operate to perform a toggle operation in producing the value of $M_k$ bit when an equal number of the prescribed signals are 1 and 0 for a received phasor moving either 0° or 180° between adjacent sample times such that its direction is indeterminate.

The exclusive-OR gates 111 and 113 in FIG. 9 cooperate to produce the first prescribed signal (defined by the term (i)) and the inverse thereof on lines 121 and 125. Similarly, gates 114 and 115 cooperate to produce the second prescribed signal (term (ii)) and the inverse thereof on lines 122 and 126. The gates 114 and 116 cooperate to produce similar indications on lines 123 and 127 for the term (iii). Finally, the exclusive-OR gates 111 and 112 cooperate to produce outputs on lines 124 and 128 defined by the term (iv), and the inverse thereof. The NOR-gates 141-144 operate on the prescribed logic signals for causing the output of gate 145 on line 147 to be a logic 1 and 0 when the majority of the prescribed signals are logic 1 and 0, respectively. Conversely, gates 131-134 are responsive to the inverse of the prescribed logic signals for causing NOR-gate 135 to produce a logic 0 and 1 on line 137 when the majority of the prescribed signals are a logic 1 and 0, respectively. The outputs of both of the gates 135 and 145 are a logic 1 when an equal number of prescribed signals are 1 and 0. The operation of the remainder of the circuit in FIG. 9 is summarized in the tabulation in FIG. 10. As is indicated there, a logic signal is required on both of the lines 137 and 147 to designate whether the majority of the terms in equation (14) are a logic 1 or 0.

Considering the overall operation of the processor circuitry in FIG. 9, when a majority of the prescribed signals on lines 121-124 are a logic 1, then the signals on lines 137 and 147 are a logic 0 and 1. This causes a logic 1 on line 138 that is passed by OR-gate 151 to disable OR-gate 161 and prevent flip-flop 162 being toggled by a clock pulse. The logic 0 on line 148 at this time enables both of the NOR-gates 152 and 153, the former being responsive to the logic 0 on line 137 for producing a logic 1 on line 156, which disables NOR-gate 154 so that the output $\overline{M_k}$ thereof is low. This operation of gates 152 and 154 determines the state of the output $\overline{M_k}$ bit regardless of the state of the $\overline{Q}$ output of flip-flop 162 on line 167. The logic signal produced on line 164 during the $k^{th}$ symbol interval is inverted by amplifier 155 to produce the timing phase error bit $M_k$ on line 165. Timing phase error bits $M_k$ are averaged by lowpass filter 58 in FIG. 1 to obtain an indication $m_k'$ which is applied to loop 20 for adjusting the phase of the local clock signal c(t). The signal on line 164 is also applied to flip-flop 158, which stores it to produce the inverse of this signal on line 168 during the next symbol interval. This operation is summarized in the first and second rows of FIG. 10.

Conversely, when a majority of the prescribed signals are logic 0, the logic 1 and 0 on lines 137 and 147 are inverted by gates 136 and 146 so that OR-gate 151 again outputs a logic 1 which disables OR-gate 161 and flip-flop 162. The logic 1 on line 148 also disables both of the NOR-gates 152 and 153 so that the outputs thereof are low to cause the output $\overline{M_k}$ of gate 154 to now be a logic 1, independent of the state of the output of the toggle flip-flop 162. This operation is summarized in the third and fourth rows in FIG. 10.

This description of the operation of the output logic circuit 69 illustrates that flip-flop 162 holds the Q and $\overline{Q}$ states thereof whenever the majority of the prescribed signals are either high or low. When an equal number of the prescribed signals are a 1 and 0, however, the direction in which the received phasor moves between adjacent sample times is indeterminate. This causes both of the signals on lines 137 and 147 to be high to cause the signal on lines 138 and 148 to both be low. This makes the output of gate 151 low to enable OR-gate 161 so that it is responsive to the next local clock pulse on line 173 for toggling flip-flop 162 to cause its $\overline{Q}$ output to change logic levels. This toggling of the state of flip-flop 162 occurs only during symbol intervals in which a logic 0 on line 157 enables gate 161 and indicates that an equal number of prescribed signals are a logic 1 and 0. The logic 1 on line 137 disables NOR-gate 152 to make its output low for enabling gate 154. The logic 0 on line 148, however, enables NOR-gate 153 so that its operation, and the logic state of the output $\overline{M_k}$, is now controlled by the $\overline{Q}$ output of flip-flop 162 on line 167. A logic 1 on line 167 causes the output of gate 153 to be low so that the output $\overline{M_k}$ of gate 154 is high during the current symbol interval. Conversely, a logic 0 on line 167 causes the output of gate 153 to be high so that the output $\overline{M_k}$ of NOR-gate 154 is a logic 0. The current $\overline{Q}$ output of flip-flop 162 is held until the next symbol interval in which the logic signals on lines 137 and 147 are again both high. It is only then that the $\overline{Q}$ output of flip-flop 162 changes state. This operation is summarized in the fifth and sixth rows in FIG. 10.

Figure 11:
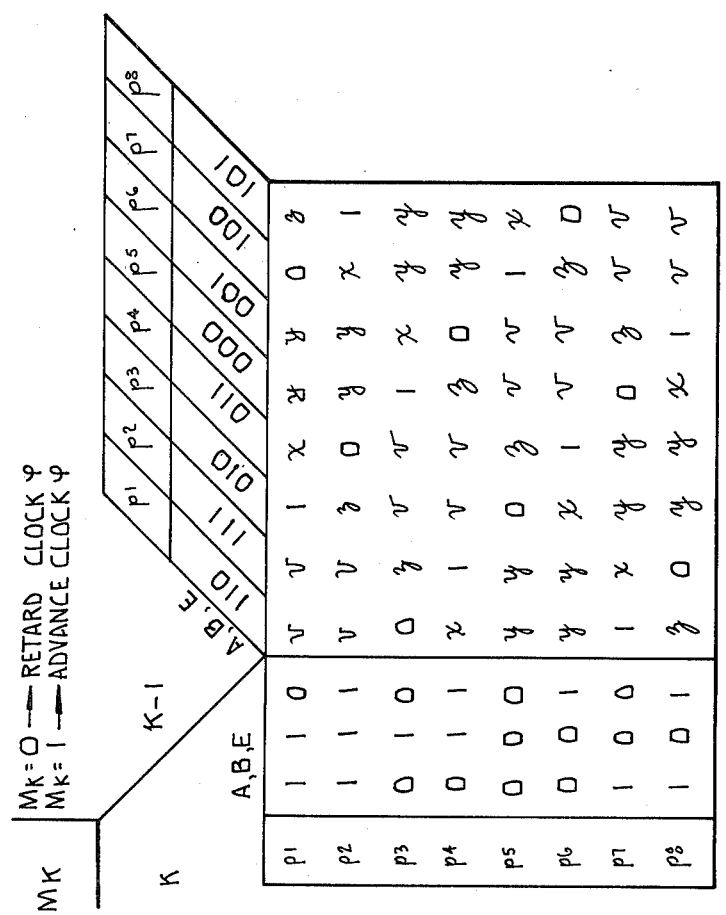
FIG. 11 on sheet 7 is a tabulation illustrating the operation of the processor 61 in FIG. 9 upon consideration of the logic levels of the signal variables A, B, and E in a current $k^{th}$ symbol interval and the prior $K-1^{th}$ symbol interval.

The operation of the processor circuit 61 in FIG. 9 for producing a binary timing phase error bit $M_k$ is illustrated and described in a different manner in the tabulation in FIG. 11 and the plot in FIG. 12. The tabulation in FIG. 11 defines $M_k$ as a function of logic levels of tribit words ABE in adjacent symbol intervals which specify portions of the plot in FIG. 12 containing estimates $\theta_k$ of the phases of received phasors.

Allowable phasors in a 4-phase PSK system are specified in FIG. 12 as passing through the nodes n1, n4, n2, and n3 at $\pm 45°$ and $\pm 1$ 135°, respectively, for simplicity of illustration. As a result of intersymbol interference and non-optimum sampling by the local clock, however, the signals $a(t)_k$ and $b(t)_k$ in the phase estimator of FIG. 1 may define received phasors with different orientations, e.g., as extending from the origin 40 the points p1, p2, etc. Logic values of A and B specify a quadrant in FIG. 12 containing the received phasor defined by $a(t)_k$ and $b(t)_k$. Logic levels 1 and 0 of $E_k$ indicate that the received phasor is either counterclockwise or clockwise of the threshold lines $a_k \pm b_k = 0$ which have slopes of $+45°$ and $-45°$ with respect to the origin. Thus, if A and B are both a logic 1, indicating that the senses of $a_k$ and $b_k$ are both positive, then the received phasor is in the first quandrant. If $E_k$ is a logic 0 at this time, indicating that the sense of the signal phase error $e(t)_k$ is negative, then the received phasor is clockwise of the threshold line $a_k - b_k = 0$ and of the allowable phasor oriented at $\theta_k = +45°$ such that the received phasor may be directed toward the point p1. Conversely, if $E_k$ is a logic 1 at this time (indicating that the signal phase error $e(t)_k$ is positive) then the received phasor is counterclockwise of the line $a_k - b_k = 0$ and of the allowable phasor oriented at $\theta_k = +45°$ such that it may be directed toward the point p2. Thus an octant in FIG. 12 containing each received phasor is defined by the tribit word ABE in the associated symbol interval. Such definitions of the position of a phasor during a number of adjacent symbol intervals contain information about the timing phase error. The processor circuit 61 in FIG. 9 essentially compares tribit words ABE defining the position of received phasors in adjacent symbol intervals to determine whether the local clock is causing early or late sampling of the received signal in order to obtain the timing phase error bit $M_k$ for use in adjusting the phase of the local clock c(t).

In the following description, it will be assumed that the phasor during the prior or $k-1^{th}$ symbol interval is directed toward the point p1. If the current received phasor is directed toward either of the points p1 or p2 in the $k^{th}$ sampling interval, then it is assumed to return to the same node (i.e., the phase difference $\Delta\theta_k = 0°$) such that its direction between sampling intervals is indeterminate. In this instance, flip-flop 162 in FIG. 9 is toggled prior to gate 154 initiating an $M_k$ bit, as indicated by the letters v in FIG. 11. The same operation is required when the current phasor is directed toward either of the nodes p5 and p6, since it is not possible here to know in which direction the phasor rotated 180°. This toggle operation is indicated by the letters y in FIG. 11. When the current phasor is directed toward node p3, then the phasor is moving counterclockwise such that the $E_{k-1}$ and $E_k$ bits are both low for indicating that s(t) started early and was sampled early in consecutive symbol intervals. This condition requires $M_k$ to be a logic 0 for causing the phase of the clock in loop 20 to be retarded by an incremental amount. When the current phasor is directed toward the node p7, however, then the phasor is moving clockwise such that the $E_{k-1}$ and $E_k$ bits are both low for now indicating that s(t) started late and was sampled late in consecutive symbol intervals. This condition requires $M_k$ to be a logic 1 for causing the phase of the local clock to be advanced. The processor circuit 61 operates in a similar manner when the received phasor moves from a node p2 in one symbol interval to nodes p4 and p8 (where $E_{k-1}$ and $E_k$ are now both high) for producing $M_k$ bits which are high and low, respectively. If the prior and current phasors in adjacent symbol intervals are directed towards nodes p1 and p4, however, the phasor is moving counterclockwise, but the $E_{k-1}$ and $E_k$ bits are of opposite logic levels 0 and 1 for indicating that s(t) started early and was sampled late. This condition causes the flip-flop 162 to be triggered prior to gate 154 initiating an $M_k$ bit, regardless of the direction in which the phasor is rotating. This condition is indicated by the letter x in FIG. 11. This same operation is required when the phasor starts late and is sampled early, e.g., when the prior and current phasors in adjacent symbol intervals are directed toward the nodes p1 and p8, regardless of the direction of rotation of the phasor. This condition is indicated by the letter z in FIG. 12.

The tabulation and phasor plot in FIGS. 13 and 14 are similar to those in FIGS. 11 and 12, respectively, for illustrating the operation of the processor in FIG. 9, where the signals $E_k$ and $E_{k-1}$ are derived in accordance with the operation of circuit 79 in FIG. 8, as a function of the variables A, B, A+B, and A−B during adjacent symbol intervals. These four variables define the operation of a 4-phase PSK system directly in that they define octants in FIG. 14 containing received phasors. In an 8-phase PSK system, it is only necessary to utilize the additional variable $E_k$ to completely define the operation of an 8-phase PSK system in accordance with this invention. Allowable phasors are then oriented at phase angles $\theta_k$ of ±22.5°, ±67.5°, ±112.5° and ±157.5°, for example, with respect to the origin. The variable $E_k$ is a logic 1 and 0 on the counterclockwise and clockwise sides of these threshold lines at odd multiples of 22.5°. The resultant representation in FIG. 14 and the tabulation in FIG. 13 define the operation of such an 8-phase PSK system by 5-bit words A, B, A+B, A−B, and E.

The processor circuit 61 in FIG. 9 requires that flip-flop 162 establish a logic condition which sets the state of $M_k$ when a toggle operation is required, the state of the logic condition in flip-flop 162 being changed only when a toggle operation is required. In a modified form of this invention for causing the state of the $M_k$ bit to be the inverse of what is was during the preceeding symbol interval (i.e., $M_k = \overline{M_{k-1}}$) when a toggle operation is required, the D-input of flip-flop 162 is connected to the $\overline{M_k}$ ouput on line 164 instead of to the $\overline{Q}$ output thereof; the NOR gate 136 and OR-gate 151 are omitted from the circuit; and OR gate 161 is continuously enabled by tying its second input to a logic 0 level. This causes flip-flop 162 to invert the signal $\overline{M_k}$ on line 164 during each symbol interval so that the signal on line 164 will be the opposite or inverse of what it was during the preceeding symbol interval when a toggle operation is required. A similar operation is obtained by omitting the NOR-gate 136, OR-gate 151, and flip-flop 162 from the circuit of FIG. 9 and connecting the Q-output of flip-flop 158 to line 167 for driving NOR-gate 153.

The operation of the processor circuit 61 in FIG. 9 satisfies the expression in braces in equation (14). Signal processors embodying this invention may also be implemented that satisfy other of the expressions in equations (6)–(14) and the sum or difference thereof. By way of example, the combining and majority logic circuits for processors that satisfy the limitations in braces in equation (11) and (13) are illustrated in FIGS. 15 and 16, respectively. The output logic circuits for the processors in FIGS. 15 and 16 are the same as that illustrated in FIG. 9.

Figure 24:
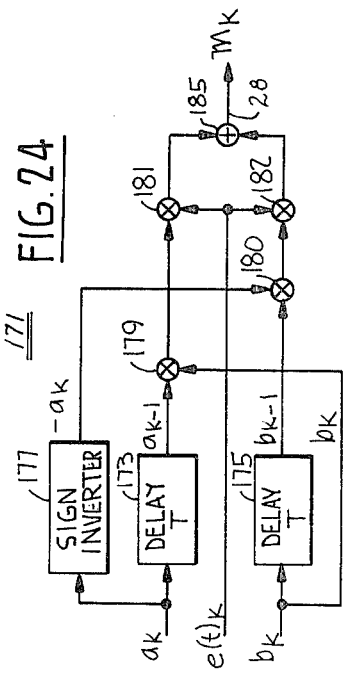
FIG. 24 on sheet 12 is a block diagram of an analog signal processor 171 embodying this invention.

In a processor circuit 61 that satisfies requirements in braces in equation (6), for example, a direction signal that is proportional to the sine of the phase difference $\Delta\theta_\kappa = (\theta_k - \theta_{k-1})$ may be produced directly or by interrogating a ROM look-up table containing values of this trigonometric function for quantized values $a_k$, $a_{k-1}$, $b_k$, and $b_{k-1}$. The signal from the ROM and $e(t)_k$ are then combined in a product multiplier to produce an analog timing phase error signal $m_k$ that is averaged in lowpass filter 58 in FIG. 1 to obtain the indication $m_k'$ of the expected value in equation (6), which drives the phase lock loop 20 to adjust the phase of the local clock signal c(t). Also, analog signals corresponding to all of the terms in equations (9) and (10) are produced by the difference circuit 19 and phase estimator 38 in FIG. 1 in various symbol intervals. A signal processor 25 producing an analog timing phase error signal $m_k$ on line 28 and satisfy equations (9) and (10) or the sum and difference thereof is therefore obtainable with delay lines, product multipliers and combining circuits. The processor circuit 171 in FIG. 24 comprises analog delay lines 173 and 175, a circuit 177 for inverting the sense of the signal $a_k$, analog multipliers 179–182 and an analog adder 185 for operating on the analog signals $a_k$, $b_k$, and $e(t)_k$ in a manner that satisfies equation (6) for producing an analog timing error signal $m_k$ in line 28.

It has been discovered that digital words defining the phase differences $\Delta\theta_\kappa$ in equations (6)–(8) actually contain information as to the direction of rotation of a phasor between adjacent symbol intervals. Such words are readily obtainable from $a_k$ and $b_k$ in the processor 25 in FIG. 1, since this is the decoded data on line 26 in a differential PSK data system. Digital words defining $\Delta\theta_\kappa$ are also obtainable from the binary variables A, B, $\overline{A}$ and $\overline{B}$ in various symbol intervals, e.g., in the manner illustrated in FIG. 17. The circuit there is responsive to variables A and B for phasors numbered in Graycode (see FIG. 2) for producing Gray-code indications $X_kY_k$ of phase differences $\Delta\theta_\kappa$ (see FIG. 3). The exclusive-OR gate 190 converts Gray-code indications $X_kY_k$ into associated indications $V_kW_k$ numbered clockwise in straight-binary.

A processor 201 that is responsive to the local clock $\overline{c}(t)$, a binary signal phase error bit $E_k$ and Gray-code indications $X_kY_k$ in a 4-phase PSK system for producing binary timing phase error bits $M_k$ is illustrated in FIG. 18. The operation of processor 201 is specified by the Boolean expressions (21), (22), and (23) in FIG. 18 and in columns 1, 4, and 7 of FIG. 21. The processor 201 comprises an exclusive-OR gate 203, inverter 204, and AND-gates 205 and 206 for producing logic signals on lines 221 and 222 corresponding to the first and second terms in expression (21); a toggle circuit 208; and an OR-gate 216. The toggle circuit 208 comprises a pair of NOR-gates 210 and 212 and a D-type flip-flop 214. The output of the exclusive-OR gate 203 is high for phase differences other than 0° and 180°, i.e., except when the direction of the phasor is indeterminate, for disabling NOR-gates 210 and 212 so that the output $M_k$ of OR-gate 216 is determined by signals on lines 221 and 222 in the manner specified by the first two terms in the Boolean expression (21) and in column 7, rows 3, 4 and 7 of FIG. 21. When the phase difference $\Delta\theta_k$ is 0° and 180°, however, the signals on lines 221 and 222 are both low for enabling gate 216. The output of exclusive-OR gate 203 is also low at this time for enabling gates 210 and 212 so that the local clock signal $\overline{c(t)}$ on line 24 causes the output of gate 210 to go high to toggle flip-flop 214. Since both of the gates 212 and 216 are now enabled, the state of the Q-output of flip-flop 214 is the logic level of the $M_k$ bit on line 224 at this time. This operation of toggle circuit 208 is specified by the Boolean expression (23). There are Gray-code type binary-coded-decimal indications other than the one in FIG. 21, column 1, and FIG. 3 for which the processor circuit 201 will operate to satisfy the objects of this invention.

Figure 3:
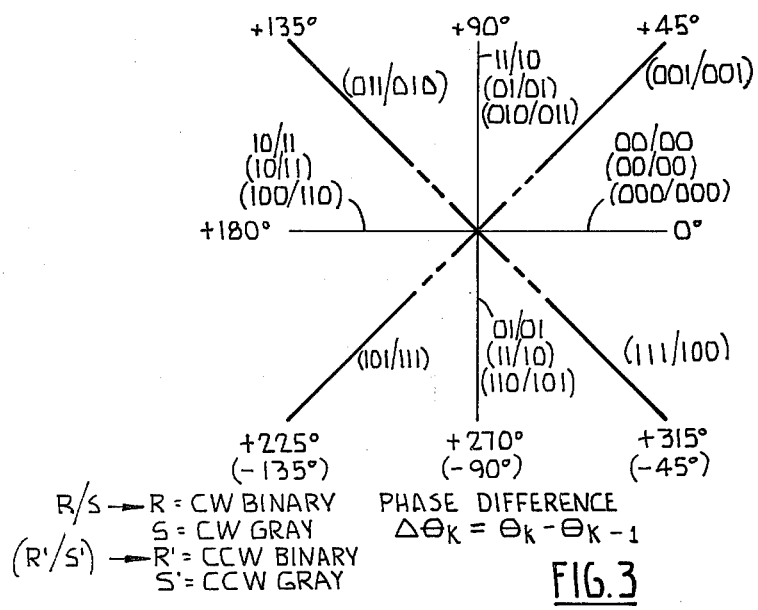
FIG. 3 on sheet 2 is a plot of sequential phase differences $\Delta\theta_K$; the pairs of dibits without and with parentheses designating phase differences numbered clockwise and counterclockwise, respectively; the dibits above and below the slash lines being binary and Gray-coded designations of associated phase differences in a 4-phase system; and the tribits there being counterclockwise-numbered binary and Gray-code designations of phase differences in an 8-phase system.

Digital dibit words $V_kW_k$ designating phase differences $\Delta\theta_\kappa$ and numbered consecutively in counterclockwise and clockwise directions are tabulated in columns 2 and 3, respectively, of FIG. 21, and are illustrated in FIG. 3. It has been discovered that the most significant bit (MSB) of such words that is necessary to designate phase differences $\Delta\theta_\kappa$ also defines the direction in which a phasor moves between adjacent symbol intervals, except where $\Delta\theta_\kappa=0°$ and 180°. If it is assumed that the $M_k$ bit will be a logic 1 as often as it is a logic 0 for $\Delta\theta_\kappa=0°$ and 180°, however, then the MSB $V_k$ of such dibit words $V_kW_k$ also specify the direction of a phasor for phase differences of 0° and 180°. As is illustrated in FIG. 21, column 2, an MSB of 0 and 1 indicates that a phasor is moving counterclockwise and clockwise, respectively. Conversely, for clockwise numbered phase differences $\Delta\theta_\kappa$ in column 3 of FIG. 21, an MSB of 0 and 1 indicates that a phasor is moving clockwise and counterclockwise, respectively.

Figure 19:
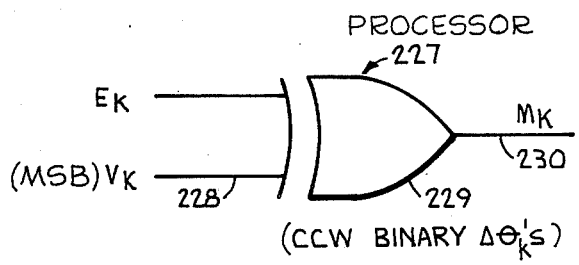
FIG. 19 on sheet 3 is a circuit diagram of an alternate embodiment of this invention that is responsive to only the signal phase error bit $E_k$ and the most significant bit (MSB)$V_k$ of counterclockwise numbered binary dibit phase difference representations $V_kW_k$ for producing a binary timing phase error bit $M_k$.
Figure 20:
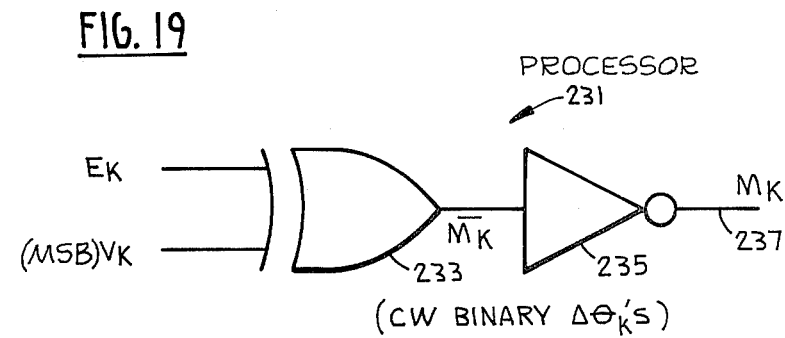
FIG. 20 on sheet 3 is a circuit diagram of a modified form of the embodiment of this invention in FIG. 19 which is responsive to only the binary timing phase error bit $E_k$ and the MSB $V_k$ clockwise numbered binary dibit phase difference representations $V_kW_k$ in FIG. 17 for producing a binary timing phase error bit $M_k$.

A processor circuit 227 which is responsive to the indication $E_k$ of the sense of the signal phase error and to the MSB $V_k$ of consecutively counterclockwise-numbered binary dibit words defining phase differences $\Delta\theta_\kappa$ is illustrated in FIG. 19. It comprises a single exclusive-OR gate 229. The operation of a processor circuit 227 that is specified in columns 2, 4 and 8 of FIG. 21 also satisfies the requirements of equations (19A) and (19B). As is indicated in FIG. 21, the binary value of $M_k$ is the same as and the opposite of that of $E_k$ when the MSB $V_k$ is 0 and 1, respectively. Although the operation of the processor circuit in FIG. 19 is illustrated in relation to a 4-phase PSK system, it operates in the same manner for higher-order PSK systems which do not have to be differentially phase-modulated PSK systems. It is only necessary to produce a digital indication of $\Delta\theta_\kappa$ to provide sufficient information for the processor 227 to operate properly. The processor circuit 231 in FIG. 20 operates in a similar manner for combining a signal phase error bit $E_k$ and the MSB $V_k$ of clockwise numbered digital words defining phase differences $\Delta\theta_\kappa$. The processor circuit 231 comprises an exclusive-OR gate 233 and an inverter 235. The output $\overline{M_k}$ of gate 233 is inverted to provide the timing phase error bit $M_k$ on line 237. The operation of processor circuit 231 also satisfies the requirements of equations (19A) and (19B) and is specified in columns 3, 4 and 9 of FIG. 21. As is indicated in columns 8 and 9, the only difference between timing phase error bits $M_k$ produced in the circuits of FIGS. 19 and 20 is that they are of opposite sense for phase differences of 0° and 180°. Although the direction of a phasor moves for these two phase differences is really indeterminate, this difference in operation does not seriously impair the overall operation of a demodulator 10 in FIG. 1 utilizing this invention since it may reasonably be assumed that the associated binary value of $M_k$ for $\Delta\theta_\kappa=0°$ and 180° is a 1 as often as it is a 0. Reference to column 1 of FIG. 21 reveals that both the MSB and the LSB of the Gray-code words $X_kY_k$ defining $\Delta\theta_\kappa$ there also specify the direction of rotation of phasors. There are also other Gray-codes having bits that specify the direction of phasors between sample times. It is only necessary then to apply a signal phase error bit $E_k$ and the associated Gray-code bit to an exclusive-OR gate to obtain the desired digital indication $M_k$ of timing phase error. If this indication is of the incorrect sense to make $G_{\pm 1}$, for example, converge toward 0-value, it is only necessary to invert the derived $M_k$ bit prior to applying it to filter 58 in FIG. 1 for accomplishing the objects of this invention.

Figure 22:
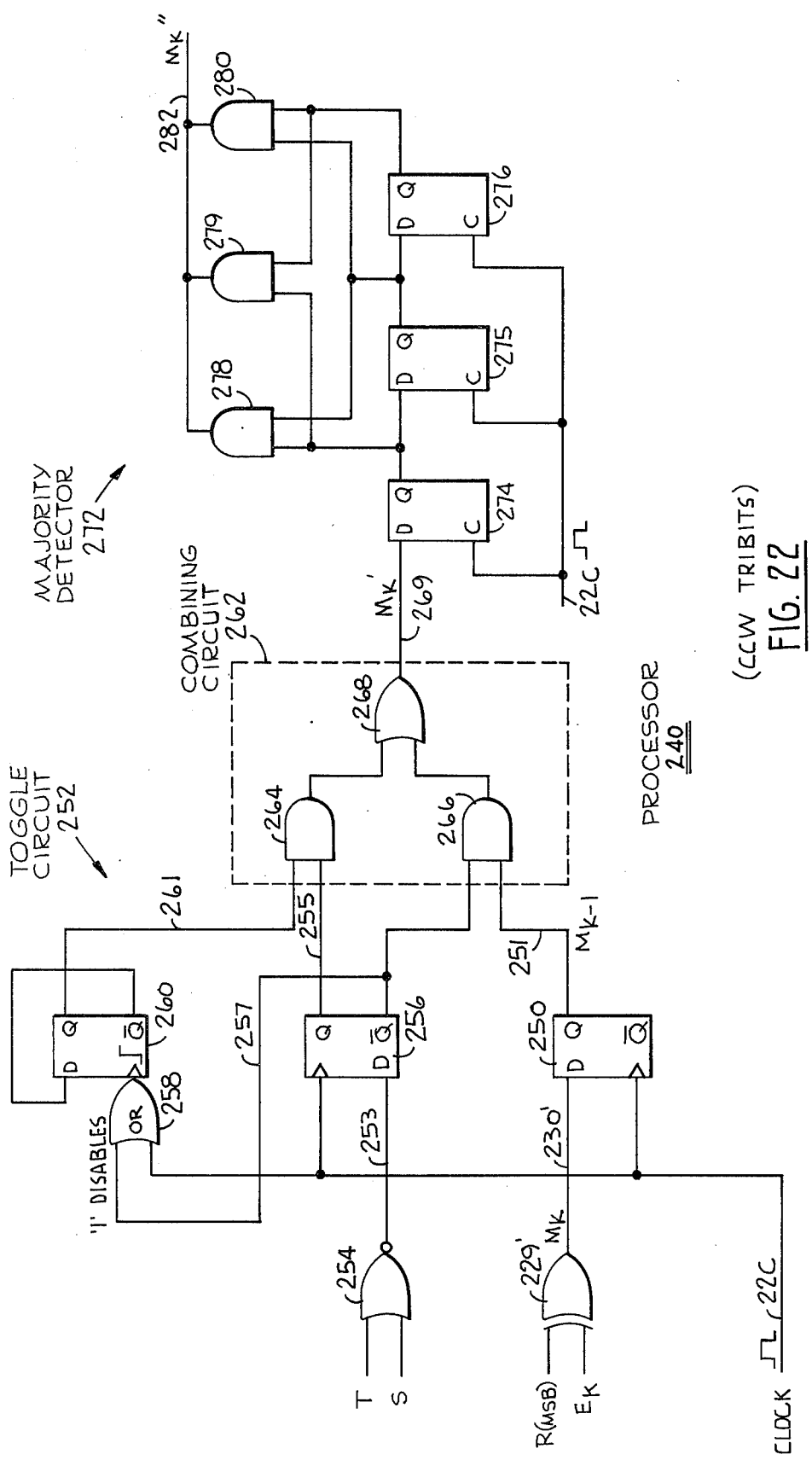
FIG. 22 on sheet 11 is a circuit diagram of a modified form of the embodiment of this invention in FIG. 19, for an 8-phase system, for producing binary timing phase error bits $M_k'$ determined during three adjacent symbol intervals for producing a timing phase error bit $M_k''$ on line 28 in FIG. 1 and which is employed to adjust the phase of the local clock timing signal $c(t)$.

A modified form of the processor circuit 227 for an 8-phase PSK system is illustrated in FIG. 22. In the processor circuit 240 there, a toggle value of an intermediate timing phase error bit $M_k'$ is produced on a line 269 for phase differences of 0° and 180°, and intermediate timing phase error bits $M_k'$ of the same level must occur in two out of three adjacent sample intervals before an output timing phase error bit $M_k''$ of that level is produced on an output line 282. This processor circuit 240 comprises an exclusive-OR gate 229' (which corresponds to the gate 229 in FIG. 19) and a D flip-flop 250 for delaying the timing phase error signal on line 230'; a toggle circuit 252 comprising a NOR-gate 254 and a pair of D flip-flops 256 and 260; a combining circuit 262 comprising a pair of AND-gates 264 and 266, and an OR-gate 268; and a majority detector 272 comprising a plurality of D flip-flops 274–276 and a plurality of AND gates 278–280 and which produces the output timing phase error bit $M_k''$ on line 282. An MSB of 0 and 1 for counterclockwise numbered tribits RST defines phase differences $\Delta\theta_\kappa$ specifying phasors rotating counterclockwise and clockwise, respectively. The tribits RST corresponding to phase differences for the indeterminate states where $\Delta\theta_\kappa=0°$ and $\Delta\theta_\kappa=180°$ are defined as 000 and 100, respectively. Thus, either one or both of the bits S and T is high for a phase difference corresponding to a determinate state. This drives the output of NOR-gate 254 low for causing the Q-output of flip-flop 256 to be clocked low for disabling AND-gate 264 and causing the $\overline{Q}$ output of this flip-flop 256 to be high for enabling gate 266, and disabling OR-gate 258 and thus the toggle circuit 252. The delayed timing phase error bit on line 251 is then passed by gates 266 and 268 onto line 269. If the $M_k'$ bit on line 269 is high for two out of three adjacent sample times, then the Q outputs of a majority of the flip-flops 274–276 are high. This causes the output of at least one of the AND-gates 278–280 to be high so that the output timing phase error bit $M_k''$ on line 282 is high for indicating that intermediate phase error bits $M_k'$ produced during at least two out of three adjacent symbol intervals are high. Conversely, the output of the majority detector on line 282 is low if the output of the majority of the flip-flops 274–276 are low for indicating that the intermediate timing error bit $M_k'$ is low in two out of three adjacent symbol intervals. In this manner, the majority logic circuit 272 operates to increase the probability that the level of the output timing phase error bit on line 282 is correct and to render the processor circuit 240 less sensitive to noise.

Consider now that the Q and $\overline{Q}$ outputs of flip-flop 260 are low and high and that the tribit RST during the previous symbol interval defined a determinate phase difference so that the high $\overline{Q}$ output of flip-flop 256 disables OR-gate 258. Consider further that during the current and subsequent symbol intervals, the tribit RST defines one of the indeterminate phase differences of 0° and 180°. This means that both of the inputs to NOR-gate 254 are now low so that the output thereof is high to trigger flip-flop 256 on the current clock pulse. Since the signal on line 257 is already high on the rising edge of the current clock pulse, OR-gate 258 and flip-flop 260 remain disabled at this time. Triggering of flip-flop 256, however, causes its $\overline{Q}$ output to now be low to disable gate 266 and enable OR-gate 258. The Q output of flip-flop 256 at this time enables gate 264 so that its output on line 264 is controlled by the state of the Q output of flip-flop 260. Since this signal on line 261 is low at this time, the output of gates 264 and 268 are low. Receipt of the next clock pulse triggers flip-flop 260 for toggling or inverting the Q and $\overline{Q}$ outputs thereof. This makes the signal on line 261 and the intermediate timing phase error bit $M_k'$ high. If the tribits RST define phase differences of 0° or 180° for a number of consecutive symbol intervals, the signals on lines 255 and 257 remain high and low for holding gates 264 and 258 enabled so that flip-flop 260 is triggered by each clock pulse for alternating the logic level of the Q output thereof on line 261 and that of the intermediate timing phasor error bit $M_k'$ on line 269.

When a determinate state occurs following an indeterminate state, the gate 254 holds flip-flop 256 for receipt of another clock pulse and the flip-flop 260 toggles once more when it is clocked before it is disabled by the output of flip-flop 256 going high. Therefore, flip-flop 260 toggles once for each encountered intermediate state.

Figure 23:
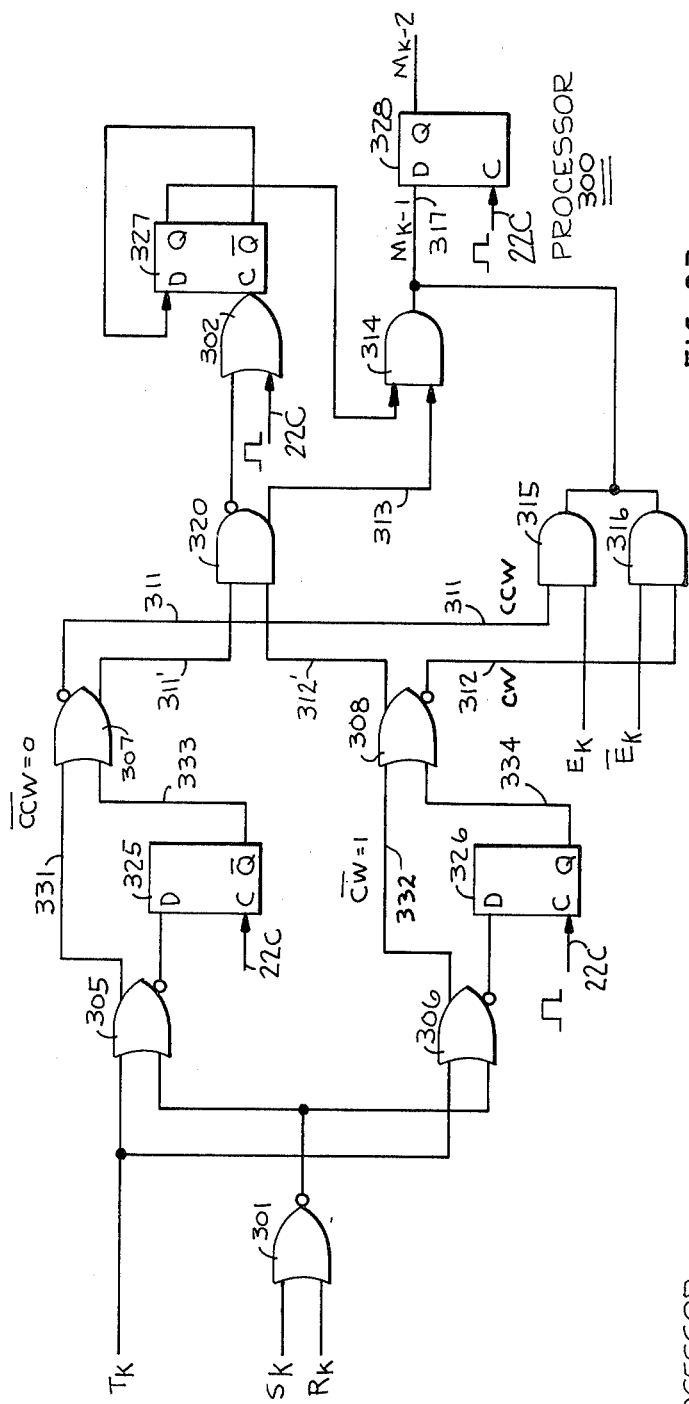
FIG. 23 on sheet 12 is a circuit diagram of an alternate embodiment of this invention that is responsive to clockwise numbered binary tribit words RST defining phase differences $\Delta\theta_K$ in an 8-phase PSK data system for producing a timing phase error bit $M_k$.

An alternate embodiment of this invention for producing a timing, phase error signal $M_{k-1}$ on a line 317 in an 8-phase PSK system is illustrated in FIG. 23. A modem receiver produces consecutively clockwise numbered binary tribit words RST indicating differences $\Delta\theta_\kappa$ between the phases $\theta_\kappa$ of phasors in adjacent symbol intervals, where RST=000 and 100 for $\Delta\theta_\kappa$=0° and 180°, respectively. The processor circuit 300 in FIG. 23 is responsive to the binary tribit words RST for determining whether the state of the $M_{k-1}$ bit corresponds to one of the indications $E_k$ and $\overline{E}_k$ of the sense of the signal phase error or is to be determined by a toggle operation. The processor circuit 300 comprises NOR gate 301 and OR gate 302, gates 305–308 having both OR and NOR-outputs, AND-gates 314–316, a gate 320 having both AND- and NAND-outputs, and D-type flip-flops 325–328. The output of AND-gate 314 is disabled by a logic 0 on line 313 when a toggle operation is not required. The variables $E_k$ and $\overline{E}_k$ are applied to associated AND-gates 315 and 316, which have the outputs thereof tied to the output of gate 314 for controlling generation of the $M_{k-1}$ bit when this gate 314 is disabled. When the signals on lines 311 and 312 are individually a logic 1, for indicating that a phasor moved counterclockwise and clockwise and for enabling gates 315 and 316, then the $M_k$ bit on line 317 has the same logic value as $E_k$ and $\overline{E}_k$, respectively. The gates 301, 305 and 306 process the tribits RST for producing a logic 0 and 1 on lines 331 and 332 for indicating that the phasor is not moving counterclockwise and is not moving clockwise, respectively. The flip-flops 325 and 326 produce similar indications on lines 333 and 334 from the preceding symbol interval.

If either (or both) of the inputs to each of the gates 307 and 308 is high, then both of the NOR-outputs thereof are low to disable the associated AND-gates 315 and 316, and both of the OR-outputs thereof are high to indicate than an RST indication corresponds to a phase difference of either 0° or 180°. This causes the AND- and NAND-outputs of gate 320 to be high and low to enable gates 314 and 302 so that the next clock pulse triggers flip-flop 327 and the Q-output thereof is passed by gate 314 as the timing phase error bit $M_{k-1}$ on line 317. If both of the inputs to gate 307 are low, then the output on the line 311' is low to disable gates 320 and 314, and the output on line 311 is high to indicate that the phasor is moving counterclockwise and to enable gate 315 so that it passes the $E_k$ bit as the signal $M_{k-1}$. Similarly, if both the inputs to gate 308 are low, then the output on line 312' is low to disable the gates 320 and 314, and the output on line 312 is high to indicate that the phasor is moving clockwise and to enable gate 316 to pass the $\overline{E}_k$ bit as the signal $M_{k-1}$ on line 317.

Although this invention is described in relation to preferred embodiments thereof, variations and modifications thereof will occur to those skilled in the art without departing from the spirit and the scope of this invention. By way of example, a digital control word of more than one binary bit may be produced for defining the timing phase error. Also, the level of an output timing phase error bit may be conditioned on the level of intermediate timing phase error bits in a plurality of greater than three sample intervals. Further, this invention is applicable for producing time phase error bits in systems with multidimensional signal sets other than PSK systems. Additionally, the received signal s(t) does not have to be perfectly equalized as was assumed here for simplicity of illustration. The processors embodying this invention in FIGS. 19 and 20 are described in relation to a 4-phase PSK system for consecutive binary numbered dibit representations of phase differences. Alternatively, other codes such as adding a constant LSB, MSB or intermediate bit to the binary dibits or certain other Gray-codes may be used to define phase differences $\Delta\theta_\kappa$. It is only necessary then to locate the bit of a digital word representation of $\Delta\theta_\kappa$ that is of one logic level for $0° \leq x + \Delta\theta_\kappa < 180°$ and the other logic level for $180° \leq x + \Delta\theta_\kappa < 360°$. The bit can also be of one and other logic levels for $0° < x + \Delta\theta_\kappa \leq 180°$ and $180° < x + \Delta\theta_\kappa \leq 360°$. This bit is then applied to the exclusive-OR gate in FIG. 19. If this indication is of the incorrect sense to make $G_{\pm 1}$, for example, converge toward 0-value, it is only necessary to invert the derived $M_k$ bit prior to applying it to filter 58 in FIG. 1 for accomplishing the objects of this invention. Also, a coded digital word defining $\Delta\theta_\kappa$ may be applied to a decoder (not shown) that produces a single bit whose logic level is 1 or 0 for indicating whether a phasor is moving clockwise or counterclockwise, this bit being applied to input line 228 to the exclusive-OR gate in FIG. 19. Additionally, the method of this invention may be implemented with programmed digital computer circuitry. Further, the level of the output signal $M_k$ on line 230 in FIG. 19 during one symbol interval in which a determinate phasor is received may be inverted during the next or a subsequent symbol interval in which an indeterminate phasor is received rather than producing toggle conditions which are held in memory and employed as in circuitry of FIG. 22. The scope of this invention is therefore defined by the attached claims rather than the aforementioned detailed descriptions of preferred embodiments thereof.

What is claimed is:

1. In a synchronous PSK data transmission system including receiver circuitry providing a local clock timing signal c(t) and receiving a data signal s(t) which includes data pulses coded during sample times into the phase of a carrier frequency signal, apparatus for producing a first error signal that is a timing phase error signal, comprising:

first means responsive to the receive data signal s(t) and the local clock timing signal c(t) for producing a second error signal $e(t)_k$ that is a sample of the signal phase error signal e(t), the latter being a measure of the angular difference between the phase $\theta(t)_k$ of a received signal phasor obtained from the received data signal s(t) and the phase $\theta_k$ of a nearest allowable phasor member of an ideal set of signal phasors, where the $k$ indicates the value thereof at a sample time; the second error signal being an analog signal having a sense and magnitude;

second means responsive to the receive data signal s(t) and the local timing signal c(t) for producing a sample value $d1_k$ of a first directional signal d1 that is a measure of the direction of rotation of a received signal phasor between adjacent sample times, the first direction signal sample having a sense and magnitude that is a measure of the sine of the phase difference $\Delta\theta_k$ between decisions as to the allowable phases $\theta_k$ of received signal phasors in adjacent symbol intervals; and third means combining the second error signal $e(t)_k$ and the first directional signal sample $d1_k$ in a manner for producing a timing phase error signal $g(t)_k$ that is a function of the product thereof and satisfies the expression $\sin(\Delta\theta_k)\,e(t)_k$, and expansions thereof, the signal $g(t)_k$ being a measure of the difference between the phase of the local timing signal and that of timing in the receive data signal for use in the receiver circuitry for adjusting the phase of the local timing signal there to be more nearly equal to the phase of timing in the received data signal.

2. Apparatus according to claim 1 wherein said second means operates for producing sample valued in-phase and quadrature-phase analog component signals $a_k$ and $b_k$ of allowable phasors associated with received signal phasors at sample times in a number of symbol intervals and defining $d1_k$, and said third means is responsive to the component signals $a_k$ and $b_k$ in various symbol intervals for producing a timing phase error signal $-g_{+1}$ satisfying the relationship $\sin(\theta_k-\theta_{k-1})e(t)_k = a_{k-1}b_k e(t)_k + \bar{a}_k b_{k-1} e(t)k$, where $\bar{a}_k = -a_k$, and expansions thereof.

3. Apparatus according to claim 1 wherein said third means operates for producing a timing phase error signal $g(t)_k$ which is a measure of the expected value of $\sin(\Delta\theta_k)e(t)_k$ and expansions thereof.

4. Apparatus according to claim 2 wherein said third means operates for producing a timing phase error signal $-g_{+1}$ which is a measure of the expected value of $a_{k-1}b_k e(t)_k + \bar{a}_k b_{k-1} e(t)_k$.

5. Apparatus according to claim 1 wherein said second means operates for producing a sample value $d1_k$ of a first analog directional signal which is a measure of the sine of the phase differences $\theta_K - \theta_{K+1}$ between decisions as to the allowable phases associated with received phasors in adjacent symbol intervals, said third means combining the first directional signal sample $d1_k$ and the second error signal sample $e(t)_k$ in a manner for producing a timing phase error signal $-g_{-1}$ which is a function of the product thereof and which satisfies the expression $\sin(\theta_k-\theta_{k+1})e(t)_k$ and expansions thereof.

6. Apparatus according to claim 5 wherein said second means operates for producing a sample value $d2_k$ of a second directional signal d2 which is a measure of the sine of the difference $\theta_k-\theta_{k-1}$ between decisions as to the allowable phases of received signal phasors in adjacent symbol intervals, said third means being responsive to the first and second directional signal samples, the second error signal sample $e(t)_k$ and the local timing signal for producing a timing phase error signal which is a measure of the product of the second error signal $e(t)_k$ and the difference between the second and first directional signal samples and which satisfies the relationship $$e(t)_k\{\sin(\theta_k-\theta_{k-1})+\sin(\theta_{k+1}-\theta_k)\} = g_{-1} - g_{+1}$$

and expansions thereof.

7. Apparatus according to claim 6 wherein said third means produces a timing phase error signal which is a measure of the expected value of the output product signal therefrom.

8. Apparatus according to claim 6 wherein said third means comprises:

fourth means for delaying the first directional signal sample $d1_k$ and the second error signal $e(t)_k$ one symbol interval; and fifth means responsive to the second directional signal sample $d2_k$, the second error signal sample $e(t)_k$, the delayed first directional signal $d1_{k-1}$, and the delayed second error signal sample $e(t)_{k-1}$ for producing an output timing phase error signal which is a measure of the difference between the product of the second error sample $e(t)_k$ and the second directional signal $\sin(\theta_k-\theta_{k-1})$ and the product of the delayed second error sample $e(t)_{k-1}$ and the delayed-first directional signal sample $\sin(\theta_{K-1}-\theta_K)$ and which satisfies the expression $e(t)_k(\sin(\theta_k-\theta_{k-1}) + e(t)_{k-1}\sin(\theta_k-\theta_{k-1})$ and expansions thereof.

9. In receiver circuitry of a synchronous PSK data transmission system receiving a data signal which includes data pulses coded during symbol intervals into the phase of a carrier frequency signal and producing a local clock timing signal, apparatus for producing in symbol intervals a binary timing phase error signal $M_k$ comprising:

first means responsive to the received data signal and the local clock signal for producing at sample times a binary signal $E_k$ representing the sense of the signal phase error, which is a measure of the angular difference between the phase $\theta(t)_k$ of a received signal phasor in the data signal and the associated phase $\theta_k$ of the nearest allowable member of an ideal set of signal phasors, where the subscript k indicates the value thereof at a sample time, and for producing binary signals $A_K$ and $B_K$ representing the sense of associated in-phase and quadrature phase component signals defining the nearest allowable phase $\theta_k$ that is associated with the phase $\theta(t)_k$ of a received signal phasor; and second means responsive to the binary signals $A_k$, $B_k$, and $E_k$ derived in a number of symbol intervals for producing binary timing phase error signals $M_k$ in symbol intervals indicating the sense of the error between the phase of the local clock signal and that of timing in the received data signal.

10. Apparatus according to claim 9 wherein said first means comprises third means, which may be a part of the receiver circuitry of the data system, responsive to the local clock signal and the received data signal for producing at sample times sample values $a_k$ and $b_k$ of in-phase and quadrature phase analog component signals defining the nearest allowable phase $\theta_k$ associated with a received phasor.

11. Apparatus according to claim 10 wherein said first means further comprises fourth means responsive to the local clock signal and to the component signal samples $a_k$ and $b_k$ for producing the binary signals $A_k$ and $B_k$ representing the sense of $a_k$ and $b_k$, respectively; and fifth means responsive to the local clock signal and the component signal samples $a_k$ and $b_k$ for producing the binary signal $E_k$ representing the sense of the signal phase error.

12. Apparatus according to claim 10 wherein said third means is further responsive to the local clock signal and the received signal for producing sample values $e(t)_k$ of an analog signal phase error signal $e(t)$, and said first means further comprises fourth means responsive to the local clock signal, the component signal samples $a_k$ and $b_k$, and the sample $e(t)_k$ of the signal phase error for providing binary signals $A_k$, $B_k$, and $E_k$ representing the sense of $a_k$, $b_k$, and $e(t)_k$, respectively.

13. Apparatus according to claim 9 wherein said second means operates for producing a first timing phase error signal $M_{k+1}$ corresponding to one of the expressions ([MAJ{$(A_{k-1} \oplus B_k \oplus E_k)$; $(\overline{A}_k \oplus B_{k-1} \oplus E_k)$}]or $M_{toggle}$) or ([MAJ{$(A_{k+1} \oplus B_k \oplus E_k)$; $(\overline{A}_k \oplus B_{k+1} \oplus E_k)$}]or $M_{toggle}$) or ([MAJ{$(A_{k-1} \oplus B_k \oplus E_k)$; $(\overline{A}_k \oplus B_{k-1} \oplus E_k)$; $(\overline{A}_{k+1} \oplus B_k \oplus E_k)$; $(A_k \oplus B_{k+1} \oplus E_k)$}]or $M_{toggle}$)

where $\oplus$ indicates an exclusive-OR type logic function; the subscripts k−1, k, and k+1 are variables having values determined during designated symbol intervals; MAJ indicates that the binary value of $M_{k+1}$ is the same as that of the majority of terms in associated braces; and $M_{toggle}$ indicates that the binary value of $M_{k+1}$ may be toggled for occurrences of an equal number of terms in associated braces being different binary values.

14. Apparatus according to calim 13 wherein said second means is operative for an $M_{toggle}$ condition for alternating the value of $M_{k+1}$ from what it was during a previous such toggle condition.

15. Apparatus according to claim 9 wherein said second means operates for producing a first timing phase error signal $M_k$ defined by one of the expressions ([MAJ{$(A_{k-1} \oplus B_k \oplus E_k)$; $(\overline{A}_k \oplus B_{k-1} \oplus E_k)$}]or $M_{toggle}$), or ([MAJ{$(A_k \oplus B_{k-1} \oplus E_{k-1})$; $(\overline{A}_{k-1} \oplus B_k \oplus E_{k-1})$}]or $M_{toggle}$), or ([MAJ{$(A_{k-1} \oplus B_k \oplus E_k)$; $(\overline{A}_k \oplus B_{k-1} \oplus E_k)$; $(\overline{A}_k \oplus B_{k-1} \oplus E_{k-1})$; $(A_{k-1} \oplus B_k \oplus E_{k-1})$}]or $M_{toggle}$)

where $\oplus$ indicates an exclusive-OR type logic function; the subscripts k−1 and k are variables having values determined at designated sample times; MAJ indicates that the binary value of $M_k$ is the same as that of the majority of terms in associated braces; and $M_{toggle}$ indicates that the binary value of $M_k$ may be toggled for occurrences of an equal number of terms in associated braces being different binary values.

16. Apparatus according to claim 15 wherein said second means is operative for an $M_{toggle}$ condition for inverting $M_k$ from what it was during a previous such toggle condition.

17. Apparatus according to claim 13 or 15 wherein said second means is operative for an $M_{toggle}$ condition for inverting the binary value of the timing phase error signal $M_k$ from what it was during the prior symbol interval.

18. Apparatus according to claim 13 or 15 including third means responsive to the first binary timing phase error signal from said second means for producing a second binary timing phase error signal which changes from one to the other binary value only when the first binary timing phase error signal is the same value for a prescribed number of symbol intervals.

19. Apparatus according to claim 13 or 15 wherein said second means comprises:
a plurality of exclusive-OR type circuit means each responsive to binary signals that represent logic variables of an associated term in an associated logic relationship for producing a plurality of first binary output signals corresponding to the logic levels of the associated terms; and
first logic means responsive to the plurality of first binary output signals of said exclusive-OR circuit means for producing said first binary timing phase error signal having different logic levels when the majority of the first binary output signals are one and other logic levels, respectively.

20. Apparatus according to claim 19 wherein said first logic means comprises second logic means holding a binary output signal in memory and being operative for inverting the logic level of the second binary signal when an equal number of first binary signals are one and other logic levels; said first logic means passing the second binary signal as the binary timing phase error indication when an equal number of the first binary signals are of one and other logic levels.

21. In synchronous PSK data transmission system transmitting data pulses coded during sample intervals into the phase of a carrier frequency signal and including receiver circuitry responsive to a received data signal and a locally generated clock timing signal for producing a signal phase error signal and a differential phase signal indicating the difference $\Delta\theta_k$ between the phases $\theta_k$ of allowable phasors, of an ideal set of symbol phasors, that are associated with receive phasors in adjacent signal intervals, the improved method of producing a timing phase error signal comprising the step of combining the signal phase error signal and the differential phase signal indicating the phase difference $\Delta\theta_k$ at sample times in a manner so as to produce a timing phase error signal in sample intervals which is a measure of the difference between the phase of the local clock timing signal and that of timing in the received data signal for use in the receiver circuitry for adjusting the phase of the local timing signal there to be more nearly equal to the phase of timing in the received data signal.

22. The method according to claim 21 wherein said combining step further comprises the steps of operating on the differential signal for producing a measure of the sine of $\Delta\theta_K$; and combining the signal phase error signal and the measure of sine $\Delta\theta_K$ at sample times for producing timing phase error signals.

23. In a synchronous PSK data transmission system in which data pulses are coded during sample intervals into the phase of a carrier frequency signal, the improved method of producing a clock timing phase error signal for use in receiver circuitry for adjusting the phase of a local clock timing signal there to be more nearly equal to the phase of timing in a received data signal comprising the steps of:

producing a first error signal representative of the signal phase error signal at sample times;

producing at sample times a first directional signal representative of the direction of rotation of receive signal phasors in the received data signal between adjacent sample times; and combining the first error signal and the first directional signal for producing a timing phase error signal representative of the difference between the phase of the local timing signal and that of timing in the received signal.

24. The method according to claim 23 wherein said second named producing step provides first directional signals in sample intervals that are representative of the phase difference $\Delta\theta_k$ between decisions as to the nearest allowable phases $\theta_k$ of receive signal phasors in adjacent sample intervals, where allowable phases $\theta_k$ are defined by an ideal set of signal phasors.

25. The method according to claim 24 wherein said second named producing step further produces first directional signals which are a measure of the sine of $\Delta\theta_K$.

26. The method according to claim 23 wherein
said first producing step produces binary signals $E_k$ representative of the sense of the signal phase error signal at sample times;
said second producing step produces binary signals $A_k$ and $B_k$ representative of the sense of associated quadrature phase component signals defining the nearest allowable phasors associated with received signal phasors; and
said combining step combines the $A_k$, $B_k$, and $E_k$ derived in a number of symbol intervals for producing a binary timing phase error signal $M_k$ representative of the sense of the difference between the phase of the local timing signal and that of timing in the received data signal.

27. In a synchronous PSK data transmission system including receiver circuitry providing a local clock timing signal c(t) and receiving a data signal which includes data pulses coded during sample intervals into the phase of a carrier frequency signal, apparatus for producing a digital control word of one or more bits indicating the sense of the timing phase error, and thus the sense of the difference between the phase of the local timing signal and that of timing in the received data signal, for use in the receiver circuitry for adjusting the phase of the local timing signal there to be more nearly equal to the phase of timing in the received data signal, said apparatus comprising:

first means responsive to the received data signal and c(t) for producing a first digital word of at least one bit indicating the sense of the signal phase error, the first word designating which side of the nearest allowable phasor of an ideal set of signal phasors a received phasor obtained from the received data signal is on;

second means responsive to the received data signal and to the local timing signal for producing a second digital word of at least one bit indicating a direction of rotation of received signal phasors between adjacent clock sample times; and third means responsive to the first and second digital words for producing the digital control word indicating the sense of the timing phase error.

28. Apparatus according to claim 27 wherein said second means produces a second digital word having one binary bit $D_k$ of one logic level for a received signal phasor moving counterclockwise and of the opposite logic level for a received signal phasor moving clockwise between adjacent sample times.

29. Apparatus according to claim 28 wherein said first means produces a first digital word having a binary bit $E_k$ indicating the sense of the signal phase error.

30. Apparatus according to claim 29 wherein said third means combines the binary bits $E_k$ and $D_k$ for producing a digital control word having a binary bit $M_k$ indicating the sense of the timing phase error.

31. Apparatus according to claim 30 wherein said second means produces a second digital word defining phase differences $\Delta\theta_k$ between the phases of allowable phasors at adjacent sample times, and the one bit $D_k$ of the second digital word is of some logic level for a phase difference of 0° and of the opposite logic level for a phase difference of 180°.

32. Apparatus according to claim 31 wherein said third means comprises exclusive-OR gate means responsive to the binary bits $E_k$ and $D_k$ for producing a binary bit $M_k$ indicating the sense of the timing phase error.

33. Apparatus according to claim 32 wherein said third means further comprises means for inverting the output of said exclusive-OR gate means.

34. Apparatus according to claim 32 or 33 including fourth means responsive to the first bit $M_k$ from said third means for producing a second binary bit $M'_k$ indicating that the sense of the timing phase error is of one level, the econd bit $M'_k$ changing logic level only when the first binary bit $M_k$ from said third means is of the other logic level at a prescribed number of adjacent sample times.

35. Apparatus according to claim 34 wherein said fourth means comprises a plurality of series-connected bistable multivibrator circuits which is greater than the prescribed number and a plurality of AND-gate means which is greater than the prescribed number, each of said AND-gate means being responsive to a prescribed number of outputs of different groups of bistable circuits, and fifth means for combining the output of said AND-gate means for producing the bit $M'_K$ indicating the timing phase error.

36. Apparatus according to claim 30 wherein said second means is operative for producing a second digital word in a Gray code which is one of a number of different Gray codes indicating the difference between the phases $\theta_k$ of allowable phasors at adjacent sample times, where each Gray code word has a bit $D_k$ thereof of one logic level for phase differences of $0° \leq (x + \Delta\theta_k) < 180°$ and of the other logic level for phase differences $\Delta\theta_k$ of $180° \leq (x + \Delta\theta_k) < 360°$, where x is a constant phase angle which may be 0°, and the bit $D_k$ may be the MSB, LSB or an intermediate bit of the Gray code indication depending on the particular Gray code employed.

37. Apparatus according to claim 36 wherein said third means comprises an exclusive OR-gate responsive to the binary bits $E_k$ and $D_k$.

38. Apparatus according to claim 30 wherein said second means is operative for producing a second digital word defining phase difference $\Delta\theta_k$ between allowable phasors at adjacent sample times where the phase differences $\Delta\theta_k$ are numbered consecutively in straight binary in a counterclockwise direction and where the binary bit $D_k$ of the second digital word is the MSB required to designate phase differences, the bit $D_k$ being one logic level for phase differences $\Delta\theta_k$ of $0° < (x + \Delta\theta_k) < 180°$ and the other logic level for $\Delta\theta_k$ of $180° < (x + \Delta\theta_k) < 360°$, where x is a constant phase difference which may be 0°.

39. Apparatus according to claim 38 wherein said third means comprises an exclusive-OR gate responsive to the binary bits $D_k$ and $E_k$ for producing the binary bit $M_k$ of the sense of the timing phase error.

40. Apparatus according to claim 30 wherein said second means is operative for producing a second digital word defining phase differences $\Delta\theta_k$ between allowable phasors at adjacent sample times where the phase differences $\Delta\theta_k$ are numbered consecutively in straight binary in a clockwise direction and where the binary bit $D_k$ of the second digital word is the MSB required to designate phase differences, the bit $D_k$ being one logic level for phase differences $\Delta\theta_k$ of $0° < (x + \Delta\theta_k) < 180°$ and the other logic level for $\Delta\theta_k$ of $180° < (x + \Delta\theta_k) < 360°$, where x is a constant phase difference which may be 0°.

41. Apparatus according to claim 40 wherein said third means comprises an exclusive-OR gate responsive to the binary bits $D_k$ and $E_k$.

42. Apparatus according to claim 41 wherein said third means further comprises means for inverting the output of said exclusive-OR gate for producing the binary signal $M_k$ indicating the sense of the timing phase error.

43. Apparatus according to claim 39 or 42 including fourth means holding a second binary bit $M_k'$ in memory and being responsive to the code of second digital words indicating received signal phasors moving 0° and 180° between adjacent symbol intervals, in a first prescribed number of adjacent symbol intervals, for alternating the logic level of the second binary bit $M_k'$, and fifth means for passing the second binary bit $M_k'$ as a third bit $M_k'$ indicating the sense of the timing phase error at sample times when received signal phasors move 0° or 180° between a second prescribed number of adjacent sample times and passing the first binary bit $M_k$ as the third binary bit $M_k'$ indicating timing phase error at other sample times.

44. Apparatus according to claim 43 including sixth means responsive to the third bit $M_k''$ from said fifth means for producing a fourth binary bit $M_k''$ indicating that the sense of the timing phase error is of one level, the fourth bit $M_k''$ changing logic level only when the third binary bit $M_k''$ from said fifth means is of the other logic level at a third prescribed number of adjacent sample times.

45. Apparatus according to claim 44 wherein said sixth means comprises a plurality of series connected bistable multivibrator circuits which is greater than the prescribed number and a plurality of AND-gate means which is greater than the prescribed number, each of said AND-gate means being responsive to a prescribed number of outputs of different groups of bistable circuits, and seventh means for combining the output of said AND-gate means for producing the fourth bit indicating the timing phase error.

46. Apparatus according to claim 30 including fourth means holding a second binary bit $M_k'$ in memory and being responsive to the code of second digital words indicating phasors moving 0° and 180° between adjacent symbol intervals, in a first prescribed number of adjacent symbol intervals, for alternating the logic level of the second binary bit $M_k'$, and fifth means for passing the second binary bit $M_k'$ as a third bit $M_k''$ indicating the sense of the timing phase error at sample times when received signal phasors move 0° or 180° between a second prescribed number of adjacent sample times and passing the first binary $M_k$ as the third binary bit $M_k''$ indicating timing phase error at other sample times.

47. Apparatus according to claim 46 including sixth means responsive to the third bit $M_k''$ from said fifth means for producing a fourth binary bit $M_k''$ indicating that the sense of the timing phase error is of one level, the fourth bit $M_k''$ changing logic level only when the first binary bit $M_k$ from said fifth means is of the other logic level at a third prescribed number of sample times.

48. In a synchronous PSK data transmission system transmitting data pulses coded during sample intervals into the phase of a carrier frequency signal and including receiver circuitry providing a local clock timing signal and responsive to a received data signal for producing a signal phase error signal and a first digital word indicating the difference $\Delta\theta_k$ between the phases $\theta_k$ of allowable phasors, of an ideal set of signal phasors, that are associated with received signal phasors in adjacent symbol intervals, the method of producing a timing phase error bit $M_k$ comprising the steps of:

producing a binary bit $E_k$ defining the sense of the signal phase error, and combining the binary bit $E_k$ and the first digital so as to produce a binary timing error bit $M_k$ in symbol intervals which defines the sense of the difference between the phase of the local timing signal and that of timing in the received data signal for use in the receiver circuitry for adjusting the phase of the local timing signals there to be more nearly equal to the phase of timing in the received data signal.

49. The method according to claim 48 wherein the first digital signal includes a binary bit $D_k$ indicating the direction of rotation of a received signal phasor between sample times, said combining step including the step of exclusive-ORing the binary bits $E_k$ and $D_k$ for producing the binary timing phase error bit $M_k$.

50. The method according to claim 49 wherein said combining step includes the additional step of inverting the binary timing phase error bit $M_k$ when the binary bit $D_k$ of the first digital word defines phase differences that are consecutively numbered clockwise in straight binary.

51. The method according to claim 49 or 50 wherein the binary bit $D_k$ is of some logic level for a phase difference of 0° and is of the opposite logic level for a phase difference of 180°.

52. The method according to claim 49 or 50 including the additional steps of:

holding a second binary bit $M_k'$ in memory;

alternating the logic level of the second bit $M_k'$ for first digital words indicating received signal phasors moving 0° and 180° between adjacent sample times in a prescribed number of adjacent sample intervals;

said combining step including the steps of passing the second bit $M_k'$ in memory as a third binary timing phase error bit $M_k''$ when the first digital word indicates received signal phasors moving 0° and 180° in the prescribed number of adjacent sample intervals, and passing the first binary timing phase error bit $M_k$ as the third bit $M_k''$ at other sample times.

* * * * *

UNITED STATES PATENT AND TRADEMARK OFFICE
CERTIFICATE OF CORRECTION

PATENT NO. : 4,234,957             Page 1 of 3
DATED       : November 18, 1980
INVENTOR(S) : Robert J. Tracey, Stevan D. Bradley, William F. Hartley It is certified that error appears in the above-identified patent and that said Letters Patent are hereby corrected as shown below:

| COLUMN/CLAIM | LINE | ITEM | SHOULD READ |
|---|---|---|---|
| 3 | 1 | ference between | ference $\Delta\Theta_k$ between |
| 4 | 43 | $V_k$ clockwise | $V_k$ of clockwise |
| 6 | 10 | multi-dimensional structures | multi-dimensional signal structures |
| 6 | 46 | f(t nt) | f(t-nt) |
| 7 | 30 | decisiondirected | decision-directed |
| 7 | 42 | hower | however |
| 8 | 39 | not | nor |
| 10 | 42 | $-\Theta_k)-$ | $-\Theta_k)$ |
| 11 | 13 | $a_k=-a_k$ | $\bar{a}_k=-a_k$ |
| 11 | 35 | indeterminate values | indeterminate when values |
| 11 | 41 | MAJ{- | MAJ{ |
| 12 | 15A Eq. | $=9°$ | $=0°$ |
| 12 | 15C Eq. | $=1$ | $=-1$ |
| 12 | 16 Eq. | $E_k/I$ | $E_k \vert I$ |
| 12 | 18 Eq. | $\Lambda_k$ | $\Theta_k$ |
| 12 | 42 | $[I(\Delta\Theta_k=-1]$ | $[I(\Delta\Theta)E_k \vert \Delta\Theta_k=-1]$ |
| 12 | 46 | $\sqrt{b}$ | $\sqrt{2}$ |
| 12 | 19A Eq. | $=0°,+90°$ | $=0°, +45°, +90°$ |
| 12 | 20 Eq. | $E_k/J$ | $F_k \vert J$ |

UNITED STATES PATENT AND TRADEMARK OFFICE
CERTIFICATE OF CORRECTION

PATENT NO. : 4,234,957            Page 2 of 3
DATED : November 18, 1980
INVENTOR(S) : Robert J. Tracey, Stevan D. Bradley, William F. Hartley It is certified that error appears in the above-identified patent and that said Letters Patent are hereby corrected as shown below:

| COLUMN/CLAIM | LINE | ITEM | SHOULD READ |
|---|---|---|---|
| 13 | 41 | $G_{-1}^{-}{}_{+1}$ | $G_{-1}^{-}G_{+1}$ |
| 18 | 56 | $\overline{A}$ and B | $\overline{A}$ and $\overline{B}$ |
| 21 | 29 | "on line 264" | (delete phrase) |
| 21 | 30 | Since this signal | since the signal |
| 21 | 51 | timing, phase | timing phase |
| 23/1 | 41 | direction signal | directional signal |
| 24/8 | 44 | sample $dl_k$ | $dl_k$ |
| 24/8 | 47 | error signal sample | error signal |
| 24/8 | 49 | signal sample | signal |
| 24/8 | 52 | error sample | error signal |
| 24/8 | 54 | error sample | error signal |
| 25/13 | 50 Eq. | $E_k)\{]$ | $E_k)\}]$ |
| 25/14 | 67 | calim | claim |
| 28/34 | 57 | econd | second |
| 29/38 | 27 | $\Delta\Theta-$ | $\Delta\Theta$ |
| 29/39 | 34 | $M_k$ of the | $M_k$ indicating the |
| 29/40 | 44 | $\Delta\Theta-$ | $\Delta\Theta$ |

UNITED STATES PATENT AND TRADEMARK OFFICE
CERTIFICATE OF CORRECTION

PATENT NO. : 4,234,957                      Page 3 of 3

DATED : November 18, 1980

INVENTOR(S) : Robert J. Tracey, Stevan D. Bradley, William F. Hartley

It is certified that error appears in the above–identified patent and that said Letters Patent are hereby corrected as shown below:

| COLUMN/CLAIM | LINE | ITEM | SHOULD READ |
|---|---|---|---|
| 29/43 | 63 | $M'_k$ | $M''_k$ |
| 29/43 | 67 | $M'_k$ | $M''_k$ |
| 30/44 | 3 | $M''_k$ | $M'''_k$ |
| 30/44 | 5 | $M''_k$ | $M'''_k$ |
| 30/47 | 34 | $M''_k$ | $M'''_k$ |
| 30/47 | 36 | $M''_k$ | $M'''_k$ |

Signed and Sealed this

Twenty-ninth Day of September 1981

[SEAL]

Attest:

Attesting Officer

GERALD J. MOSSINGHOFF

Commissioner of Patents and Trademarks